United States Patent
Nanno

(10) Patent No.: US 8,050,779 B2
(45) Date of Patent: Nov. 1, 2011

(54) MODEL STRUCTURE PARAMETER DECISION METHOD, PARAMETER DECISION DEVICE, CONTROL DEVICE, AND TEMPERATURE ADJUSTMENT DEVICE

(75) Inventor: Ikuo Nanno, Kyoto (JP)

(73) Assignee: Omron Corporation, Kyoto (JP)

( * ) Notice: Subject to any disclaimer, the term of this patent is extended or adjusted under 35 U.S.C. 154(b) by 895 days.

(21) Appl. No.: 11/816,259

(22) PCT Filed: Feb. 16, 2006

(86) PCT No.: PCT/JP2006/302692
§ 371 (c)(1),
(2), (4) Date: Aug. 14, 2007

(87) PCT Pub. No.: WO2006/088072
PCT Pub. Date: Aug. 24, 2006

(65) Prior Publication Data
US 2009/0018676 A1    Jan. 15, 2009

(30) Foreign Application Priority Data

Feb. 18, 2005    (JP) ................................. 2005-043159

(51) Int. Cl.
*G05B 13/02* (2006.01)
(52) U.S. Cl. ................ 700/29; 700/28; 700/53
(58) Field of Classification Search ......... 700/23.28–34, 700/37, 40, 42, 45, 52, 53, 276, 278, 299, 700/300
See application file for complete search history.

(56) References Cited

U.S. PATENT DOCUMENTS

| | | | | |
|---|---|---|---|---|
| 5,920,478 A * | 7/1999 | Ekblad et al. | | 700/29 |
| 6,081,751 A * | 6/2000 | Luo et al. | | 700/42 |
| 6,688,532 B2 * | 2/2004 | Nanno et al. | | 700/29 |
| 7,149,589 B2 * | 12/2006 | Baba | | 700/28 |
| 2004/0249483 A1 * | 12/2004 | Wojsznis et al. | | 700/52 |
| 2007/0007927 A1 * | 1/2007 | Terada et al. | | 318/630 |

FOREIGN PATENT DOCUMENTS

JP    2002-340477    11/2002
JP    2004-094939    3/2004

OTHER PUBLICATIONS

Suda et al., PID Control, Asakura Publishing Co., Ltd., Mar. 10, 2000, 3 Sheets.
Yamamoto, T., et al.; A Design of Multiloop Self-Tuning PID Control Systems; Systems, Control and Information 1998, vol. 42 No. 4; 12 pages.

* cited by examiner

*Primary Examiner* — Charles Kasenge
(74) *Attorney, Agent, or Firm* — Foley & Lardner LLP

(57) ABSTRACT

To easily decide parameters of a model structure of a controlled object suitable for non-interference control.
Parameters K and T of a model structure (A structure) comprising a plurality of inputs and a plurality of outputs, wherein a difference on the output side is fed back to the input side, are calculated based on parameters a and b of a black box model (P structure) calculated through system identification or the like in accordance with predetermined conversion expressions $K=f(a,b)$ and $T=f(a,b)$.

13 Claims, 15 Drawing Sheets

F I G. 4
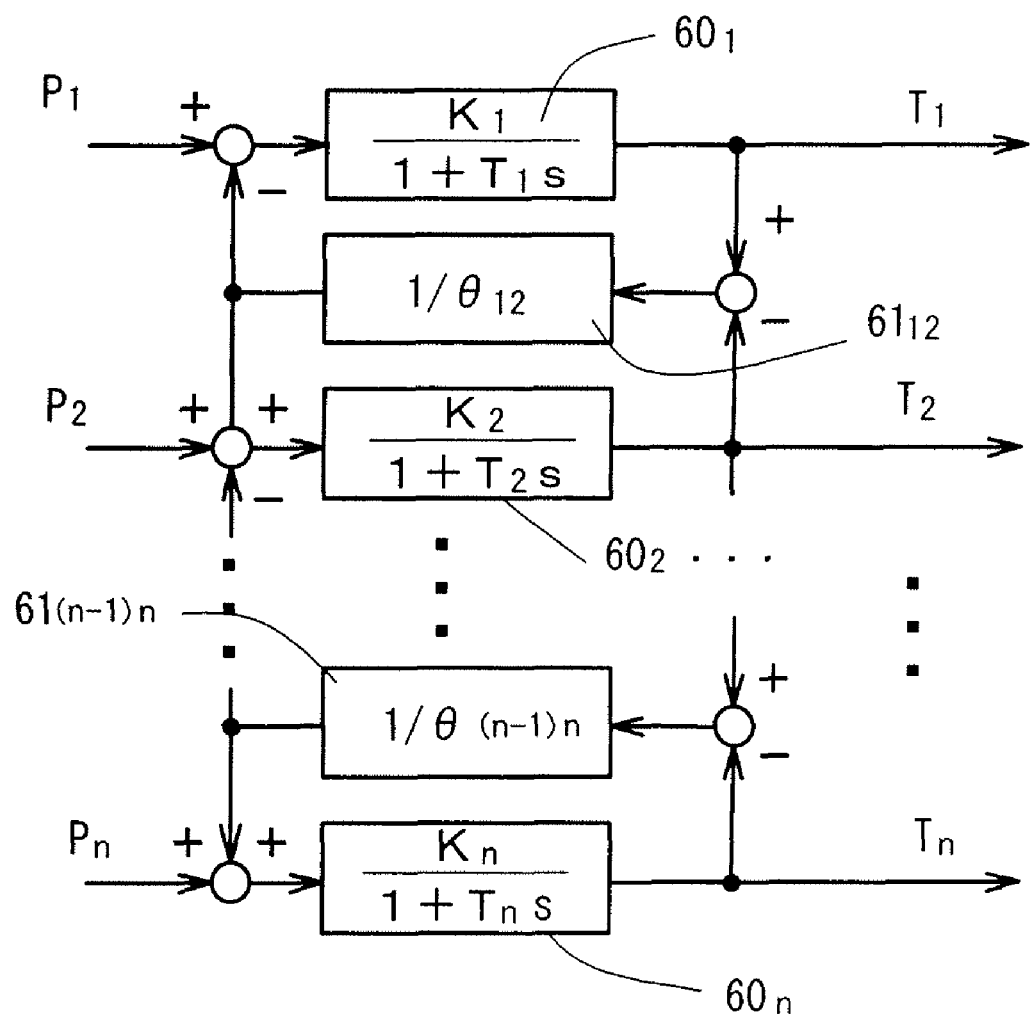

F I G. 1 9
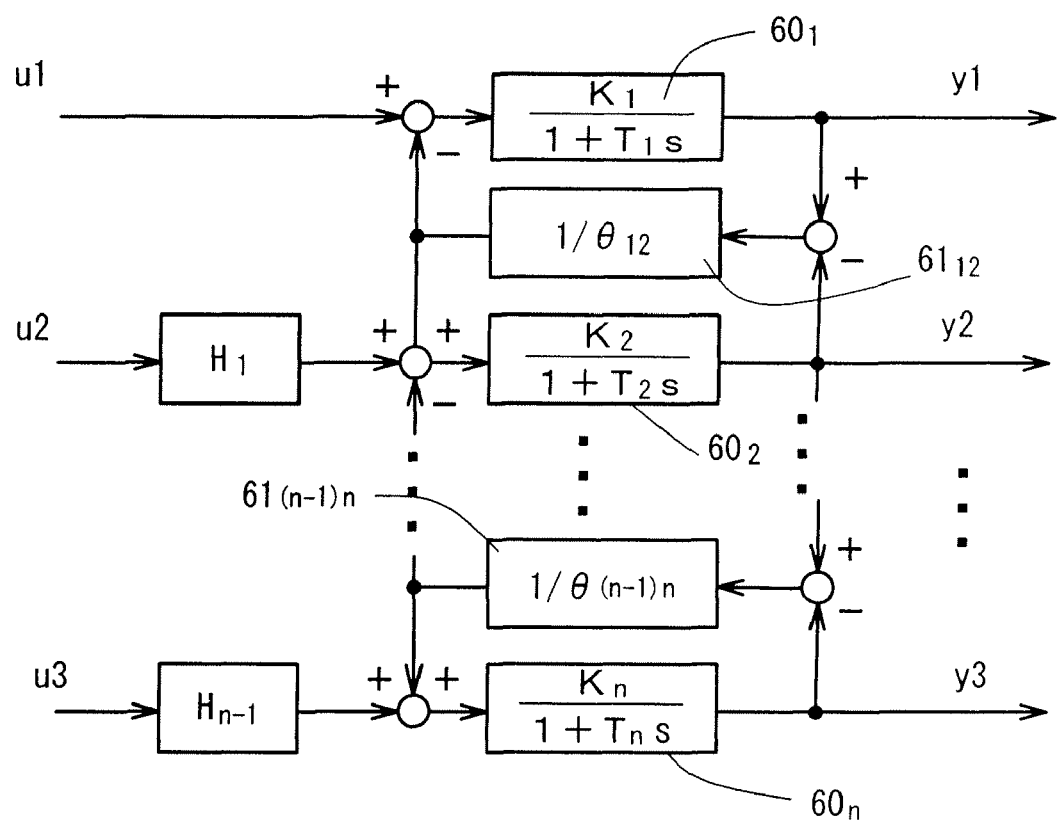

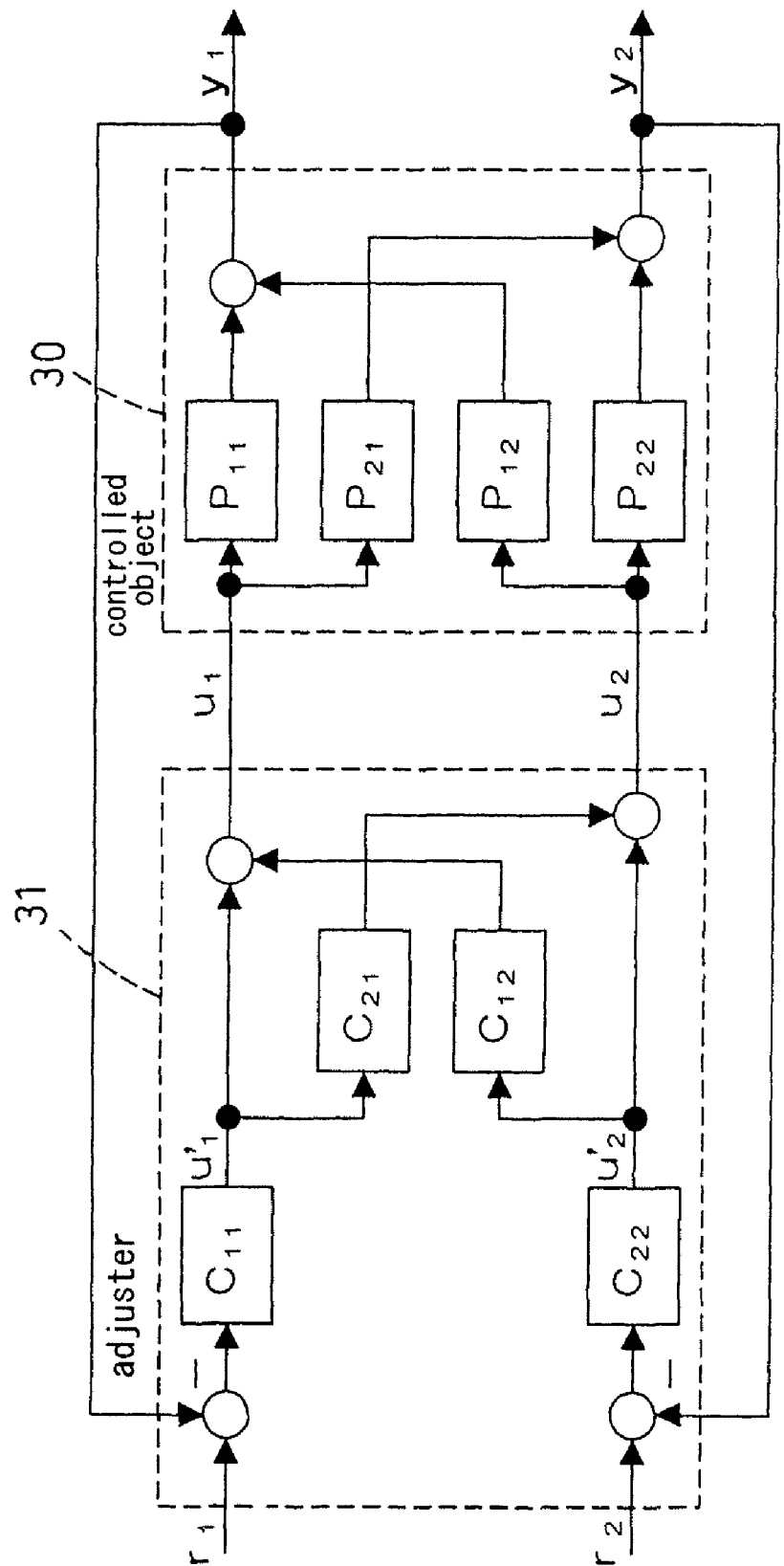
F I G. 2 0

F I G. 2 1
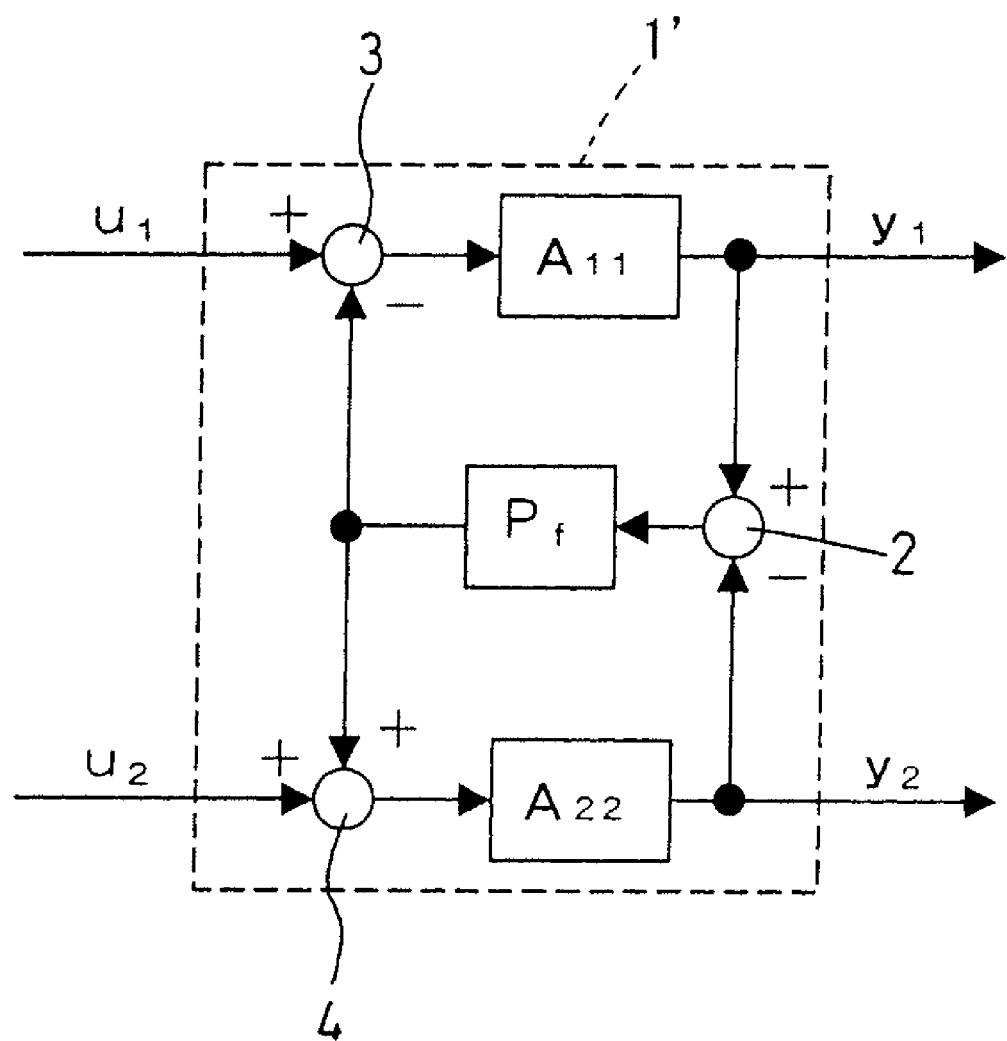

MODEL STRUCTURE PARAMETER DECISION METHOD, PARAMETER DECISION DEVICE, CONTROL DEVICE, AND TEMPERATURE ADJUSTMENT DEVICE

FIELD OF THE INVENTION

The present invention relates to a method and a device for deciding parameters of a model structure suitable for a model such as an object to be measured and a controlled object, and a control device and a temperature adjustment device in which the method and the device are used, more particularly to a method and a device for deciding parameters of a model structure suitable for controlling an object in which an interference exists, and a control device and a temperature adjustment device in which the method and the device are used.

BACKGROUND OF THE INVENTION

There is the non-interference PID control shown in FIG. 20 (for example, see the Non-Patent Document 1) as an example of the conventional technology for realizing non-interference control with respect to, for example, a controlled object comprising a plurality of inputs and outputs where an interference exists between them, in other words, a controlled object comprising a plurality of operation amounts to be inputted to the object and a plurality of control amounts from the object where there is a mutual interference between the operation amounts and the control amounts.

A controlled object 30 in this example is a controlled object where there is interference between 2ch of two inputs ($u_1$, $u_2$) and two outputs ($y_1$, $y_2$). $P_{11}$, $P_{21}$ $P_{12}$ and $P_{22}$ are transfer functions. $C_{11}$ and $C_{22}$ are main compensators which respectively output operation amounts $u_1$ and $u_2$, based on differences between control amounts $y_1$ and $y_2$ from the controlled object 30 and targeted values $r_1$ and $r_2$. $C_{12}$ and $C_2$, are cross controllers for realizing non-interference.

In the foregoing conventional example, the interferential relationship of the controlled object 30 is regarded as matrix, and dimensions of the cross controllers $C_{12}$ and $C_{21}$ for realizing the non-interference in an adjuster 31 are decided so that any interference can be eliminated.

When the cross controllers $C_{12}$ and $C_{21}$ are designed in such a manner that the control amount $y_1$ is not affected by the operation amount $u_2$, and the control amount $y_2$ is not affected by the operation amount $u_1$., any possible interference can be avoided. As a possible method for eliminating such an influence, inverse matrix may be used.

However, the interferential relationship of the controlled object 30 that is a predetermined condition of the example is not a simple and low-level matrix. Therefore, a first model in this conventional example cannot realize an ideal non-interference.

This is due to a reason because the interferential relationship of the controlled object 30 is not such a simple one-way relationship from the operation amounts u to the control amounts y.

The transfer of a heat quantity due to the interference results from a temperature difference. The transfer of the heat quantity due to the interference is large when the temperature difference between a plurality of points of the controlled object is large, while the transfer of the heat quantity due to the interference is small when the temperature difference between the plurality of points of the controlled object is small. Because such a relationship is not taken into account, the assumed model to be controlled generates a significant error, which gives a limit to a factor that can be eliminated through the inverse matrix of the non-interference control.

Therefore, the non-interference control in the conventional manner was often not applicable to practical use.

The Applicant of the present invention has already proposed a model structure suitable for the non-interference control, prediction control and the like as recited in the Patent Document 1.

FIG. 21 is a block diagram illustrating an example of a model structure 1' thus proposed. The example corresponds to the controlled object 30 in the conventional example shown in FIG. 20.

The model structure 1' is a thermal model of a controlled object of the thermal interference system provided with two inputs ($u_1$, $u_2$) and two outputs ($y_1$, $y_2$) and also a model of a controlled object comprising two channels.

As the inputs ($u_1$, $u_2$), it is possible to assume operation amounts corresponding to outputs of two heaters for respectively heating the controlled object such as the heat treatment board or the thermal treatment furnace. As the outputs ($y_1$, $y_2$), it is possible to assume control amounts which are temperatures detected from two temperature sensors for respectively detecting a temperature of the controlled object.

The model structure 1' is a model having a feedback structure which calculates a difference between the two outputs ($y_1$, $y_2$) in a subtracter 2 and feeds back the calculated difference to the two inputs ($u_1$, $u_2$) via a feedback element Pf, and feed back it after changing polarities so as to reverse in positive or negative to each other via a subtracter 3 and an adder 4.

$A_{11}$, $A_{22}$ are transfer functions from each of the inputs $u_1$ and $u_2$ to each of the outputs $y_1$ and $y_2$. In the present example, the part allocated to the two heaters of the controlled object such as the heat treatment board or the heat treatment furnace, in other words, the controlled object corresponding to each channel ch, can be grasped as the model element. The respective model elements are shown as the transfer functions $A_{11}$ and $A_{22}$.

The model structure 1' is, for example, the thermal model of the thermal interference system, wherein the heat quantity is transferred when there is any temperature difference. This is equivalent to what the Fourier's law represents, that is, the transfer of the heat quantity is in proportion to the temperature difference.

The Fourier's law is described below. For example, according to Page 6 of "Heat Transfer Engineering" by Hideaki Tasaka, published by Morikita Publishing Co., Ltd., an important factor for deciding a heat transfer amount is a spatial temperature gradient. Provided that a distance between two points is $\Delta x$, and a temperature difference between the two points is $\Delta T$, a thermal flow velocity q (heat transfer amount per unit area) is $q=-\lambda(dT/dx)$ with $\lambda$ as a thermal conductivity provided that $\Delta T/\Delta x$ is regarded dT/dx.

The feedback element Pf shown in FIG. 21 corresponds to the thermal conductivity $\lambda$ in the Fourier's law.

According to the model structure 1', the difference between the two outputs $y_1$ and $y_2$ which are the outputs of the before-mentioned respective model elements, that is, the temperature difference, is fed back to the two inputs $u_1$ and $u_2$ which are the inputs of the respective model elements, that is, the operation amounts corresponding to the heat quantity, after changing the polarities so as to reverse in positive or negative to each other via the feedback element Pf corresponding to a degree of the interference or the like. The drawing is a block diagram which shows such a thermal-interference phenomenon that the heat quantity transfers from one of the channels ch to the other channel ch, and one of the channels ch loses the heat quantity (negative), while the other channel ch gains the heat quantity (positive).

The model structure 1' represents the Fourier's law that the interference of the thermal object to be controlled means that the heat quantity transfers in proportion to the temperature difference in the case where temperature difference is generated between two temperatures.

The feedback element Pf denotes a ratio of how much heat quantity is transferred depending on the temperature difference, and may be a coefficient value or a first order lag element.

Patent Document 1: No. 2004-94939 of the Japanese Patent Applications Laid-Open

Non-Patent document 1: Page 62 of "PID Control" by Nobuhide Suda and others, published by Asakura Publishing Co., Ltd. on Mar. 10, 2000 (edited by the Institute of Systems, Control and Information Engineers)

DISCLOSURE OF THE INVENTION

Problem to be Solved by the Invention

The before-mentioned model structure feeds back the difference on the output side to the input side, which, for example, is in line with the natural phenomenon that the heat quantity transfers depending on the temperature difference. Therefore, the model structure is a so-called gray box model that is a model where physical information and blocks of a black box are combined.

It has been thought that there is no available method for deciding parameters which are coefficients of the relevant numerical expression model in the gray box model, and there is a problem that has no other choice to decide the parameters in a trial-and-error manner.

A main object of the present invention is to make it easy to decide the parameters of the model structure that is the gray box model.

Means for Solving the Problem

The present invention is constituted as follows in order to achieve the foregoing object.

1) A method of deciding parameters in a model structure according to the present invention is a method of deciding parameters in a model structure comprising a plurality of inputs and a plurality of outputs wherein a difference on the output side is fed back to the input side. According to the method, the parameters of the model structure are decided based on the output change generated when an input of an modeled object that is a target of the model structure is changed.

The parameter refers to a coefficient in the numerical expression model, and the coefficient may be a numeral value that is multiplied to a variable or a numeral value that is not multiplied to the variable.

Additionally, the input refers to an input to the model structure, and more specifically, an input fed to the modeled object in order to control a physical state of the modeled object which is a target of the model structure such as a measured object or a controlled object, for example, states of various physical quantities such as temperature, pressure, flow rate, speed and liquid level. An example of the input is an operation amount.

Furthermore, the output refers to an output of the model structure, and more specifically, an output showing a physical state of the modeled object that is a target of the model structure. The output is a detected output of the various physical quantities such as temperature, pressure, flow rate, speed and liquid level of the modeled object.

The difference on the output side refers to an output difference in the modeled structure, and more specifically, differences in the various physical quantities such as a temperature difference, a pressure difference, a flow rate difference, a speed difference and a liquid level difference.

Moreover, the difference on the output side may be a difference between respective groups of the outputs, in each of which two outputs are included. As another possible method of obtaining the difference, a plurality of outputs is divided into two groups, and a difference between the respective groups may be adopted. The difference on the output side can be arbitrarily obtained.

Further, the difference on the output side may be a difference directly obtained from the output or a difference obtained when the output is multiplied by a coefficient. Further, the difference may be obtained via a different element such as an idle time element.

The model structure feeds back the difference on the output side to the input side, which, for example, is in line with the natural phenomenon that the heat quantity transfers depending on the temperature difference. Therefore, the model structure is a so-called gray box model that is a model where physical information and blocks of a black box are combined.

The modeled object refers to a target of the model structure such as a measured object or a controlled object.

Examples of the output change generated when the input of the modeled object is changed include a step response waveform that is an output change when an input is changed stepwise and a limit cycle waveform that is an output change when the input is periodically changed based on a fixed amplitude.

"The parameters of the model structure are decided based on the output change generated when the input of the modeled object is changed" includes such a case that the modeled object is system-identified, parameters of any model other than the relevant model structure, for example, a black box model, are obtained, and the parameters of the relevant model structure are decided from the obtained parameters.

According to the present invention, the parameters of the model structure, that is the gray box model where it is conventionally believed to lack any method of deciding the parameters, can be decided based on the output change generated when the input of the modeled object is changed.

2) A method of deciding parameters in a model structure according to the present invention is a method of deciding parameters of a model structure comprising a plurality of inputs and a plurality of outputs wherein a difference on the output side is fed back to the input side. According to the method, the parameters of the model structure are decided based on parameters of a black box model.

The black box model refers to a model obtained through black box modeling. The black box modeling refers to a modeling method wherein any physical information or previous information concerning the object is not at all used.

According to the present invention, the parameters of the model structure, that is the gray box model where it is conventionally believed to lack any method of deciding the parameters, can be decided. According to the present invention, the parameters of the black box model can be used to decide the parameters of the model structure that is the gray box model, and therefore, it becomes unnecessary to decide the parameters of the model structure in a trial-and-error manner as in the conventional technology.

3) In an embodiment of the method of deciding the parameters of the model structure according to the present invention, the parameters of the model structure are decided based on the parameters of the black box model in accordance with predetermined conversion expressions.

The inventors of the present invention found out that there were predetermined conversion expressions by which the parameters of the black box model are converted into the parameters of the gray box model.

According to the present preferred embodiment, the parameters of the model structure that is the gray box model can be calculated from the parameters of the black box model in accordance with the predetermined conversion expressions.

4) In another embodiment of the method of deciding the parameters of the model structure according to the present invention, the parameters of the black box model are obtained through system identification.

According to the present preferred embodiment, the parameters of the black box model are obtained through system identification, and the parameters of the model structure can be decided based on the obtained parameters.

5) In a preferred embodiment of the method of deciding the parameters of the model structure according to the present invention, the model structure is provided with two inputs and two outputs, and comprises two model elements consisting of one input and one output, and one or two feedback elements for feeding back a difference on the output side of the model elements to the input side thereof, wherein the black box model is provided with two inputs and two outputs and comprises an interferential element for feeding one of the inputs to other output and feeding the other input to the one of the outputs.

The model element refers to an element necessary for modeling an assumed object such as a controlled object or a measured object. The model element is adapted in such a manner that physical quantities such as temperature, pressure, flow rate, speed and liquid level can be grasped as its output. The model element feeds the output as the physical quantity such as temperature, pressure or liquid level to the input such as heat flow (heat quantity), airflow or liquid flow rate when temperature control of a heart treatment board, pressure control of a container or a liquid level control of a tank is assumed, and comprises a capacity element such as heat capacity, container volume, or tank sectional area.

Therefore, any component comprising the capacity element can be grasped as the model element. Assuming that a heat treatment is performed to a wafer by a heat treatment board fixed to a supporting structure formed from metal and having a large heat capacity, for example, the heat treatment board, wafer, supporting structure and the like, which are respectively blocks having the heat capacity, can be grasped as the model elements. When the heat treatment board is temperature-controlled with heaters of a plurality of channels, the parts of the heat treatment board allocated to the heaters of the respective channels can be grasped as the model elements.

Thus, the model elements can be defined depending on properties and a structure of any targeted object such as the controlled object or the object to be measured.

The output refers to the output of the model element, and more specifically, an output showing a physical state of the model element, for example, various physical quantities such as temperature, pressure, flow rate, speed and liquid level.

The difference on the output side refers to a difference on the output side of the model element, and more specifically, differences in various physical quantities such as a temperature difference, a pressure difference, a flow rate difference, a speed difference and a liquid level difference.

According to the present embodiment, through using the parameters of the well known black box model provided with two inputs and outputs and comprising the interferential element, the parameters of the model structure provided with two inputs and two outputs and comprising the two model elements consisting of one input and one output and the two feedback elements for feeding back the difference on the output side of each the model elements to the input side thereof, can be decided.

6) In the preferred embodiment in 5), the transfer functions of the two model elements in the model structure may be first-order lag system, and the transfer function of the one or two feedback elements may be a fixed value.

According to the present embodiment, the lower-order model structure with a good reproducibility can be obtained, which can decide the parameters of the relevant model structure easily.

7) A method of deciding parameters of a model structure according to the present invention is a method of deciding parameters of a model structure provided with a plurality of inputs and a plurality of outputs, wherein a difference on the output side is fed back to the input side. The model structure comprises a plurality of model elements having one input and one output and a feedback element for feeding back the difference on the output side of the model elements to the input side thereof, wherein the model elements and the feedback element comprise resistance components, and parameters of the resistance components of the model elements and the feedback element are decided based on the changes of the plurality of outputs when the respective inputs of the modeled object which is a target of the model structure are changed.

The resistance element may be a thermal resistance.

The changes of the plurality of outputs when the respective inputs of the modeled object are changed may be changes of the plurality of outputs, in other words, a step response waveform, generated when a stepwise input is fed to the modeled object.

According to the present invention, the parameters of the resistance components of the model elements and the feedback element can be decided based on the output to the input of the modeled object, in other words, the properties of the modeled object.

8) In another preferred embodiment of the method of deciding the parameters of the model structure according to the present invention, the model elements may comprise capacity components in addition to the resistance components.

The capacity element may be a thermal capacity.

According to the present preferred embodiment, the parameters of the model elements can be decided based on numeral values of the capacity components set by a user.

9) In the preferred embodiment in 8), the parameters of the capacity components of the model elements can be decided based on the changes of the outputs when the respective inputs of the modeled object are changed.

According to the present preferred embodiment, it becomes unnecessary for the user to set the numeral values of the capacity components, and the parameters of the capacity components of the model elements can be decided based on the properties of the modeled object.

10) In yet another preferred embodiment of the method of deciding the parameters of the model structure according to the present invention, the parameters are decided based on the changes of the respective outputs when the respective inputs of the modeled object are changed stepwise.

According to the present preferred embodiment, the parameters can be relatively easily decided based on the response waveform corresponding to the stepwise input.

11) A device for deciding parameters of a model structure according to the present invention is a device for deciding parameters of a model structure provided with a plurality of inputs and a plurality of outputs, wherein a difference on the output side is fed back to the input side. In the device, the parameters of the model structure are decided based on the output change generated when the input of the modeled object that is a target of the model structure is changed.

According to the present invention, the parameters of the model structure, which is the gray box model where it is conventionally believed to lack any method of deciding the parameters, can be decided based on the output change generated when the input of the modeled object is changed.

12) A device for deciding parameters of a model structure according to the present invention is a device for deciding parameters of a model structure provided with a plurality of inputs and a plurality of outputs, wherein a difference on the output side is fed back to the input side. In the device, the parameters of the model structure are decided based on parameters of a black box model.

The parameters of the black box model may be set in and inputted to the device for deciding the parameters or may be obtained with the device for deciding the parameters.

According to the present invention, the parameters of the model structure that is the gray box model can be decided based on the parameters of the black box model, which makes it unnecessary to decide the parameters of the model structure in the trial-and-error manner as in the conventional technology.

13) In an embodiment of the device for deciding the parameters of the model structure according to the present invention, the parameters of the model structure are decided based on the parameters of the black box model in accordance with predetermined conversion expressions.

According to the embodiment, the parameters of the black box model can be calculated from the parameters of the black box model in accordance with the predetermined conversion expressions.

14) In another embodiment of the device for deciding the parameters of the model structure according to the present invention, the parameters of the black box model are obtained through system identification.

According to the preferred embodiment, the parameters of the black box model are obtained through system identification, and the obtained parameters are used to decide the parameters of the model structure.

15) In a preferred embodiment of the device for deciding the parameters of the model structure according to the present invention, the model structure is provided with two inputs and two outputs, and comprises two model elements having one input and one output respectively, and one or two feedback elements for feeding back a difference on the output side of the model elements to the input side thereof, wherein the black box model is provided with two inputs and two outputs, and comprises an interferential element for feeding one of the inputs to other output, and the other input to the one of the outputs, respectively.

According to the present preferred embodiment, through using the parameters of the conventional black box model comprising the interferential element provided with two inputs and outputs, the parameters of the model structure provided with two inputs and outputs and comprising the two model elements provided respectively with one input and one output and the two feedback elements for feeding back the difference on the output side of the model element to the input side of the model elements, can be decided.

16) In the preferred embodiment in 6), the transfer functions of the two model elements in the model structure may be set as first-order lag system, and the transfer function of the one or two feedback elements may be a fixed value.

According to the present preferred embodiment, the lower-order model structure with a good reproducibility can be obtained, which can decide the parameters of the relevant model structure easily.

17) A device for deciding parameters of a model structure according to the present invention is a device for deciding parameters of a model structure provided with a plurality of inputs and a plurality of outputs, wherein a difference on the output side is fed back to the input side. The model structure comprises a plurality of model elements having one input and one output respectively and a feedback element for feeding back the difference on the output side of the model elements to the input side thereof, wherein the model elements and the feedback element comprise resistance components, and parameters of the resistance components in the model elements and the feedback element are decided based on the changes of the plurality of outputs when the respective inputs of the modeled object which is a target of the model structure are changed.

According to the present invention, the parameters of the resistance components of the model elements and the feedback element can be decided based on the output to the input of the modeled object, in other words, the properties of the modeled object.

18) In another preferred embodiment of the device for deciding the parameters of the model structure according to the present invention, the model elements may comprise capacity components in addition to the resistance components.

According to the present preferred embodiment, the parameters of the model elements can be decided, for example, using numeral values of the capacity components set by a user.

19) In the preferred embodiment in 18), the parameters of the capacity components of the model elements may be decided based on the changes of the respective outputs generated when the respective inputs of the modeled object are changed.

According to the present preferred embodiment, it becomes unnecessary for the user to set the numeral values of the capacity components, and the parameters of the capacity components of the model elements can be decided based on the properties of the modeled object.

20) In yet another preferred embodiment of the device for deciding the parameters of the model structure according to the present invention, the parameters are decided based on the changes of the respective outputs when the respective inputs of the modeled object are changed stepwise.

According to the present preferred embodiment, the parameters can be relatively easily decided based on a response waveform corresponding to the stepwise input.

21) A control device according to the present invention is a control device for controlling a model structure provided with a plurality of inputs and a plurality of outputs, wherein a difference on the output side is fed back to the input side, as a model of a controlled object. The device comprises any of the devices for deciding the parameters recited in 11)-20), and decides the parameters of the model structure using the device for deciding the parameters.

Examples of the control using the model structure include such various controls as non-interference control, cascade control, model prediction control and Smith compensation type control.

The device for deciding the parameters may be incorporated in the control device.

According to the present invention, the parameters of the model structure which is the gray box model can be decided based on the parameters of the black box model, and it is possible to carry out the various controls using the model structure decided by the parameters.

22) A temperature adjustment device according to the present invention is a temperature adjustment device for controlling a temperature of a model structure provided with a plurality of inputs and a plurality of outputs, wherein a difference on the output side is fed back to the input side, as a model of the controlled object. The temperature adjustment device comprises any of the devices for deciding the parameters recited in 11)-20), and decides the parameters of the model structure using the device for deciding the parameters.

According to the present invention, the parameters of the model structure which is the gray box model can be decided based on the parameters of the black box model, and it is possible to carry out the various temperature controls using the model structure decided by the parameters.

23) In an embodiment of the temperature adjustment device according to the present invention, the temperature adjustment device comprises a plurality temperature control units for respectively outputting operation amounts to the controlled object based on a plurality of detected temperatures from the controlled object, and a non-interference unit for processing the operation amounts from the respective temperature control units and outputting the processed operation amounts to the controlled object so that any influence due to the control of the respective temperature control units to the control of the other temperature control unit can be removed or reduced, wherein the non-interference unit realizes the non-interference using the model structure, and the model structure feeds back a difference between the detected temperatures to the operation-amount side.

In the non-interference control, it is unnecessary to decide all of the parameters of the model structure. Therefore, since the parameters of the feedback elements for feeding back the difference on the output side to the input side can be decided, it is unnecessary to do, for example, such a complicated processing as system identification.

According to the present preferred embodiment, the parameters of the model structure can be easily set, and the non-interference with high accuracy can be achieved.

Effect of the Invention

According to the present invention, the parameters of the model structure that is the gray box model where it has been conventionally believed to lack any method of deciding the parameters can be decided based on the output change generated when the input of the modeled object is changed.

Additionally, the parameters of the black box model can be used to decide the parameters of the model structure that is the gray box model, which makes it unnecessary to decide the parameters of the model structure in the trial-and-error manner as in the conventional technology.

Besides, the parameters of the resistance components of the respective elements of the model structure can be decided based on the output to the input of the modeled object, in other words, the characteristics of the modeled object.

BRIEF DESCRIPTION OF THE DRAWINGS

FIG. 4 is a block diagram of a model structure according to another preferred embodiment of the present invention.

FIG. 19 is a drawing showing a model structure according to yet another preferred embodiment of the present invention.

FIG. 20 shows a constitution diagram of non-interference control in a conventional example.

FIG. 21 is a drawing showing a model structure that was proposed earlier.

Figure 1:
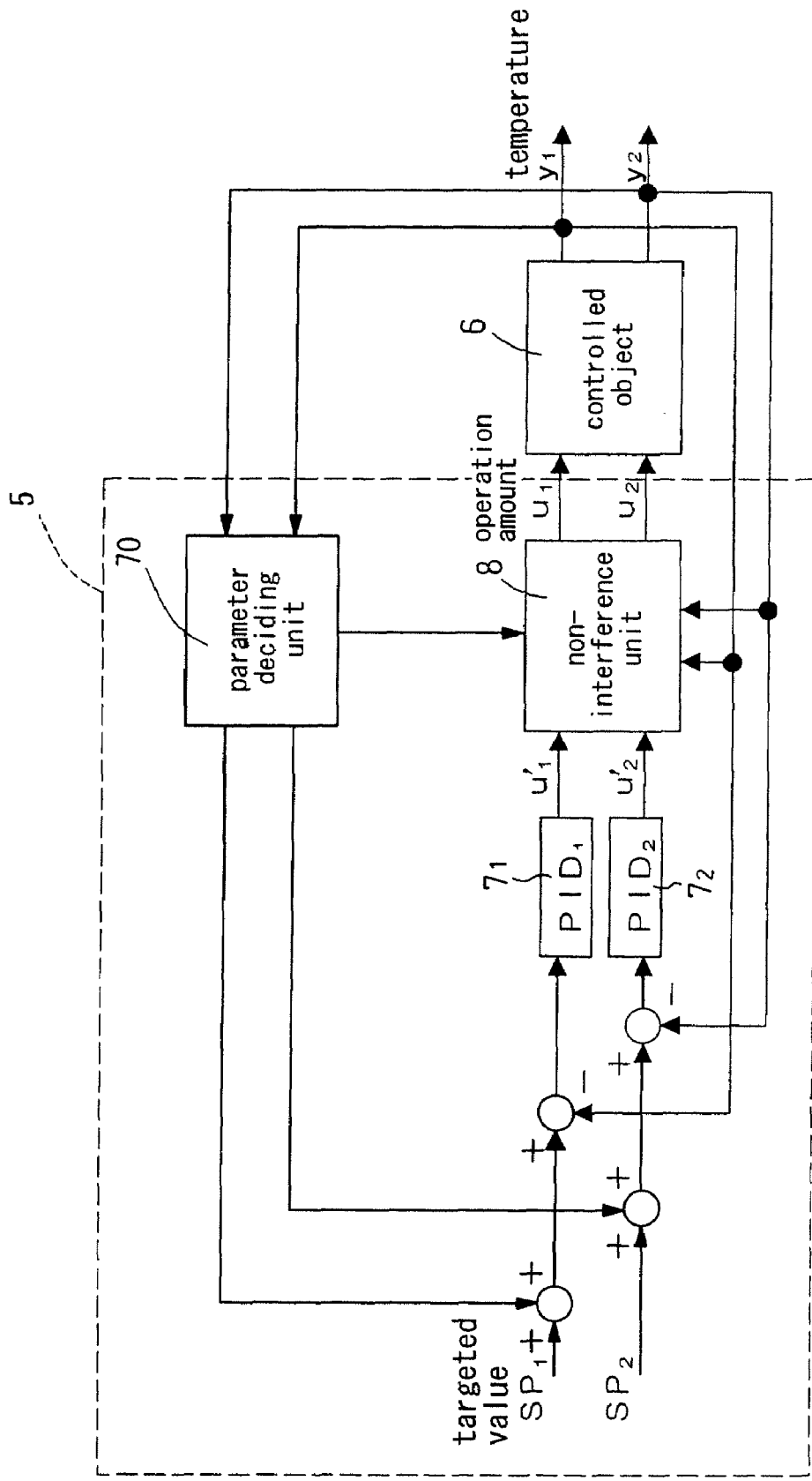
FIG. 1 shows a schematic constitution of a temperature control system in which a temperature adjustment device according to the present invention is used.

DESCRIPTION OF REFERENCE SYMBOLS 1, 1-1 model structure
5, 5-1, 5-2 temperature adjustment device
6 controlled object
8, 8-1 non-interference unit
52, 53, $60_1$-$60_n$ model element
50, 51, $61_{12}$-$61_{(n-1)n}$ feedback element
70, 70-1, 70-2 parameter deciding unit

PREFERRED EMBODIMENTS OF THE PRESENT INVENTION

Hereinafter, preferred embodiments of the present invention referring are described in detail referring to the drawings.

Preferred Embodiment 1

FIG. 1 shows a schematic constitution of a temperature control system provided with a temperature adjustment device 5 according to the present invention for performing non-interference control.

The temperature adjustment device 5 according to the present preferred embodiment performs the non-interference using the model structure proposed in the aforementioned Patent Document 1, and a parameter deciding unit 70 for deciding parameters of the model structure is incorporated therein. The parameter deciding unit 70 changes respective targeted temperatures $SP_1$ and $SP_2$ as described below when the parameters are decided.

The temperature adjustment device 5 comprises two PID control units $7_1$ and $7_2$ for respectively calculating and outputting operation amounts $u_1$, and $u_2$, based on differences between two detected temperatures $y_1$ and $y_2$ from a controlled object 6 and respective targeted temperatures $SP_1$ and $SP_2$, a non-interference unit 8 for executing the non-interference to the operation amounts $u_1$, and $u_2$, from the two control PID control units $7_1$ and $7_2$ using the model structure and outputting the processed operation amounts $u_1$, and $u_2$, to the controlled object 6, and the before-mentioned parameter deciding unit 70 for setting the decided parameters in the non-interference unit 8.

The two control PID control units $7_1$ and $7_2$, the parameter deciding unit 70, the non-interference unit 8, and the like consists of, for example, a microcomputer.

Figure 2:
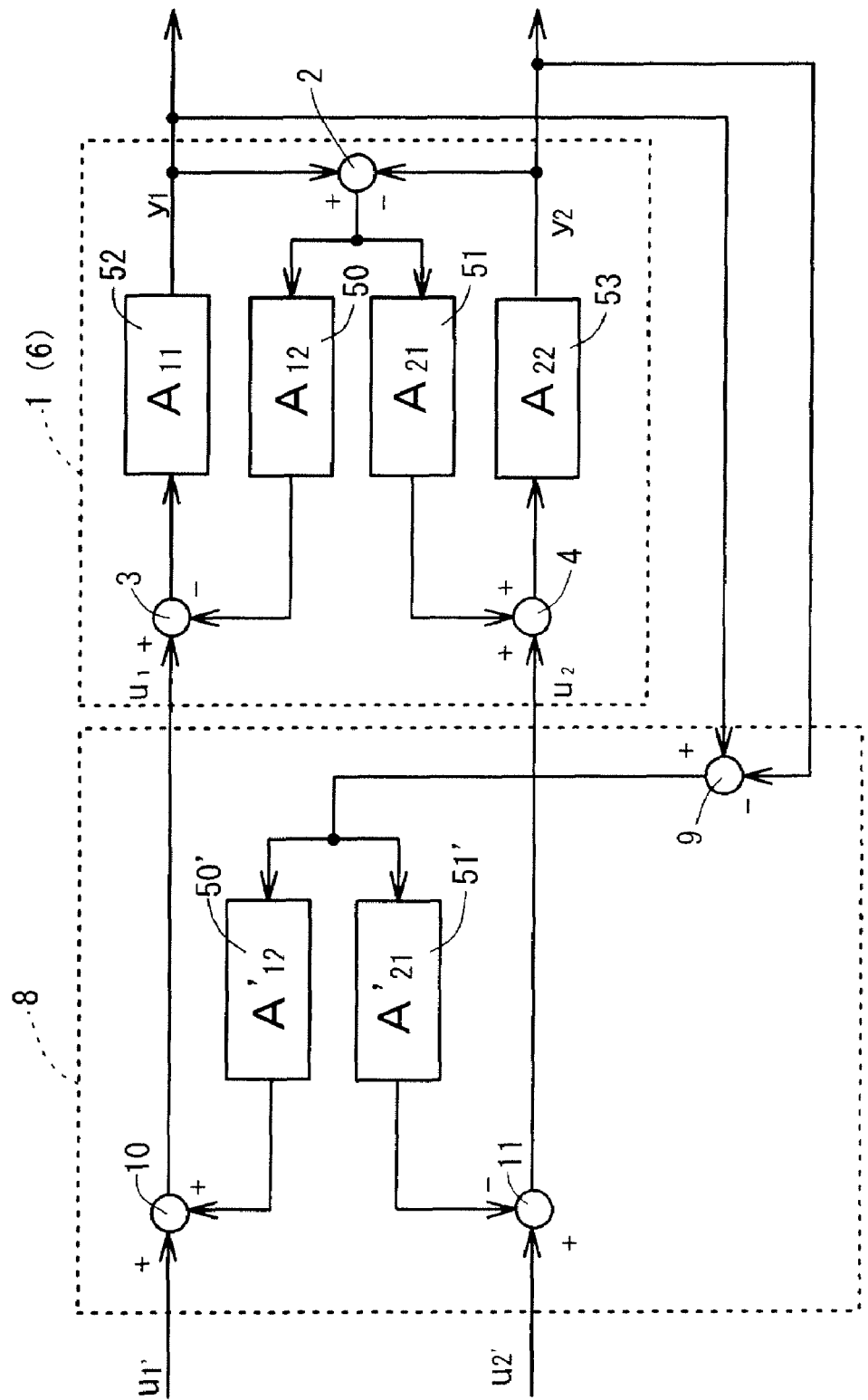
FIG. 2 is a block diagram showing a non-interference unit 8 shown in FIG. 1 and a model structure 1 which is a model to be controlled.

FIG. 2 is a block diagram showing the non-interference unit 8 and the model structure 1. The model structure 1 is obtained when the controlled object 6 is modeled as a modeled object.

The model structure 1 according to the present preferred embodiment is a thermal model of a controlled object of thermal-interference system provided with two inputs ($u_1$ and $u_2$) and two outputs ($y_1$ and $y_2$), and is a model structure of two channels.

As examples of the inputs $u_1$ and $u_2$ it is possible to assume operation amounts corresponding to the outputs of two heaters which respectively heat a controlled object such as a heat treatment board or a heat treatment furnace. As examples of the outputs $y_1$ and $y_2$, it is possible to assume control amounts which are temperatures detected from two temperature sensors which respectively detect a temperature of the controlled object 6.

The model structure 1 is a model having a feedback structure type wherein a difference between the two outputs $y_1$ and $y_2$ is calculated in a subtracter 2 and fed it back to the two inputs $u_1$ and $u_2$ via two feedback elements 50 and 51, and fed it back to them after reversing polarities in positive or negative to each other via a subtracter 3 and an adder 4, respectively.

Furthermore, as another preferred embodiment, a common single feedback element may constitute the two feedback elements 50 and 51, a model structure shown in FIG. 21 is obtained in this case.

In the present example, a part allocated to two heaters of the controlled object such as the heat treatment board or the heat treatment furnace, that is, the controlled object corresponding to each of the channels ch, is grasped as model elements 52 and 53. $A_{11}$ and $A_{22}$ are transfer functions of the model elements 52 and 53 from the inputs $u_1$ and $u_2$ to the outputs $y_1$ and $y_2$. $A_{12}$ and $A_2$, are transfer functions of the model elements 50 and 51.

The model structure 1 feeds back the difference between the two outputs $y_1$ and $y_2$, which are the outputs of the model elements 52 and 53, namely, a temperature difference, is fed back to the two inputs $u_1$ and $u_2$, which are the inputs of the model elements 52 and 53, in other words, the operation amounts corresponding to a heat quantity, via the feedback elements 50 and 51 corresponding to a degree of interference or the like with after reversing positive or negative polarity to each other.

The block diagram of the model structure 1 shows such a phenomenon of the thermal interference that the transfer of the heat quantity from one of the channels ch to the other channel ch is generated depending on the temperature difference, and the heat quantity is lost in one of the channels (negative), while the heat quantity is added in the other channel ch (positive). The relevant model structure can be referred to as a temperature-difference model.

The model structure 1 according to the present preferred embodiment represents the Fourier's law that the heat quantity transfers in proportion to the temperature difference when there are two temperatures different to each other in the interference of the controlled object of the thermal system.

The feedback elements 50 and 51 denote a ratio indicating an amount of the heat quantity that transfers depending on the temperature difference.

In the present preferred embodiment, the transfer functions $A_{11}$ and $A_{22}$ of the model elements 52 and 53 are regarded as the first-order lag system, while the transfer functions $A_{12}$ and $A_{21}$ of the feedback elements 50 and 51 are regarded as fixed values.

More specifically, $$A_{11}=K_1/(1+T_1s)$$

$$A_{12}=K_2$$

$$A_{21}=K_3$$

$$A_{22}=K_4/(1+T_4s)$$

In the foregoing expression, steady gains of the transfer functions $A_{11}$ and $A_{22}$ are $K_1$ and $K_4$, and time constants are $T_1$ and $T_4$, and the fixed values of the transfer functions $A_{12}$ and $A_{21}$ are $K_2$ and $K_3$. s denotes an operator of the Laplace conversion.

The non-interference unit 8 comprises, as shown in FIG. 2, a subtracter 9 for calculating the difference between the two outputs $y_1$ and $y_2$ of the model structure 1 of the controlled object 6, the compensating elements 50' and 51' to which the output from the subtracter 9 is fed respectively, and an adder 10 and a supracter 11 for respectively adding or subtracting the outputs of the compensating elements 50' and 51' to the inputted operation amounts $u_1$, and $u_2$.

The compensating elements 50' and 51' respectively correspond to the feedback elements 50 and 51 of the model structure 1 of the controlled object 6. Transfer functions $A'_{12}$ and $A'_{21}$ of the compensating elements 50' and 51' are equal to the transfer functions $A_{12}$ and $A_{21}$ of the feedback elements 50 and 51, and the outputs of the compensating elements 50' and 51' are fed back to the inputted operation amounts $u_1$, and $u_2$, after reversing positive or negative polarity to the respective outputs of the feedback elements 50 and 51 of the model structure 1. Herewith, the interference of the controlled object 6 is cancelled in the non-interference unit 8.

In the non-interference control, it is unnecessary to obtain the transfer functions $A_{11}$ and $A_{22}$ of the model elements 52 and 53 as far as the transfer functions $A_{12}$ and $A_{21}$ of the feedback elements 50 and 51 of the model structure 1 of the controlled object 6 are decided.

Next, a method of deciding the parameters of the model structure 1 is described.

The model structure 1 feeds back the difference on the output side to the input side, which, for example, conforms to such a natural phenomenon that the heat quantity transfers in accordance with the temperature difference. The model structure 1 is a gray box model in which physical information and blocks of a black box are combined.

It was conventionally believed that there is not any available method of deciding the parameters in the gray box model thus constituted. However, the inventors of the present invention found out the method of deciding the parameters using the parameters of the black box model.

The inventors of the present invention found out there were predetermined expressions that convert the parameters of the black box model into the parameters of the gray box model.

In the present preferred embodiment, the parameters of the model according to the conventional example shown in FIG. 20 are calculated through system identification as those of the black box model. Then, the calculated parameters are used to calculate the parameters of the model structure 1 which is the gray box model shown in FIG. 2 in accordance with the predetermined conversion expressions.

In the method of deciding the parameters according to the present preferred embodiment, first, the conventional black box model shown in FIG. 21 is system-identified by means of the ARX models, and the ARX models (discrete system) shown in the following expressions 1-4 are obtained.

$$P_{11}(q) = \frac{b_{AR11}q^{-1} + b_{AR12}q^{-2}}{1 + a_{AR11}q^{-1} + a_{AR12}q^{-2}} \quad \text{Numerical Expression 1}$$

$$P_{12}(q) = \frac{b_{AR21}q^{-1}}{1 + a_{AR11}q^{-1} + a_{AR12}q^{-2}} \quad \text{Numerical Expression 2}$$

$$P_{21}(q) = \frac{b_{AR31}q^{-1}}{1 + a_{AR11}q^{-1} + a_{AR12}q^{-2}} \quad \text{Numerical Expression 3}$$

$$P_{22}(q) = \frac{b_{AR41}q^{-1} + b_{AR42}q^{-2}}{1 + a_{AR11}q^{-1} + a_{AR12}q^{-2}} \quad \text{Numerical Expression 4}$$

The orders of the numerators and denominators of the ARX models are decided in accordance with the orders of the numerators and denominators in the occasion that the output to the input in the model structure is expressed in a polynominal expression of an operator in the Laplace conversion.

Furthermore, q denotes a shift operator, $a_{AR11}$ and $a_{AR12}$ denote parameters in the denominator, and $b_{AR11}$, $b_{AR12}$, $b_{AR21}$, $b_{AR31}$, $b_{AR41}$, and $b_{AR42}$ respectively denote parameters in the numerator. AR attached to the respective symbols indicates that the relevant symbols are the parameters of the ARX models.

Next, the obtained ARX models (discrete system) are converted into a continuous system by means of backward difference approximation. Thereby, the transfer functions, $P_{11}(s)$, $P_{12}(s)$, $P_{21}(s)$ and $P_{22}(s)$ of the black box model in the continuous system are defined as shown in the numerical expressions 5-8.

$$P_{11}(s) = K_{P_1} \frac{1 + b_{P_{11}}s}{1 + a_{P_{11}}s + a_{P_{12}}s^2} \quad \text{Numerical Expression 5}$$

$$P_{12}(s) = K_{P_2} \frac{1}{1 + a_{P_{11}}s + a_{P_{12}}s^2} \quad \text{Numerical Expression 6}$$

$$P_{21}(s) = K_{P_3} \frac{1}{1 + a_{P_{11}}s + a_{P_{12}}s^2} \quad \text{Numerical Expression 7}$$

$$P_{22}(s) = K_{P_4} \frac{1 + b_{P_{41}}s}{1 + a_{P_{11}}s + a_{P_{12}}s^2} \quad \text{Numerical Expression 8}$$

$K_{p1}$-$K_{p4}$, $a_{p11}$, $a_{p12}$, $b_{p11}$, and $b_{p41}$ are as shown in the following numerical expressions 9-16.

$$K_{P_1} = \frac{b_{AR11} + b_{AR12}}{1 + a_{AR11} + a_{AR12}} \quad \text{Numerical Expression 9}$$

$$K_{P_2} = \frac{b_{AR21}}{1 + a_{AR11} + a_{AR12}} \quad \text{Numerical Expression 10}$$

$$K_{P_3} = \frac{b_{AR31}}{1 + a_{AR11} + a_{AR12}} \quad \text{Numerical Expression 11}$$

$$K_{P_4} = \frac{b_{AR41} + b_{AR42}}{1 + a_{AR11} + a_{AR12}} \quad \text{Numerical Expression 12}$$

$$a_{P_{11}} = -\frac{(a_{AR11} + b_{AR12})\Delta T}{1 + a_{AR11} + a_{AR12}} \quad \text{Numerical Expression 13}$$

$$a_{P_{12}} = -\frac{a_{AR12}\Delta T^2}{1 + a_{AR11} + a_{AR12}} \quad \text{Numerical Expression 14}$$

$$b_{P_{11}} = -\frac{a_{AR12}\Delta T}{b_{AR11} + b_{AR12}} \quad \text{Numerical Expression 15}$$

$$b_{P_{41}} = -\frac{a_{AR42}\Delta T}{b_{AR41} + b_{AR42}} \quad \text{Numerical Expression 16}$$

Moreover, $\Delta T$ is a sampling time.

In a process of deriving the expressions after the orders of the ARX models are decided, the conventional methods are combined. The details thereof are recited in Page 89-93, in Identification of Parametric Model, in Chapter 6 of "System Identification for Control" by Shuichi Adachi, published by Tokyo Denki University, Publishing Dept.

Next, the parameters of the model structure 1 shown in FIG. 2 are decided in accordance with the predetermined conversion expressions based on the parameters of the conventional black box model shown in FIG. 20 converted into the continuous system.

In the present preferred embodiment, the parameters $K_{p1}$-$K_{p4}$, $b_{p11}$, and $b_{p41}$ shown in the numerical expressions 5-8 are used so as to calculate the steady gains $K_1$-$K_4$ and the time constants $T_1$ and $T_4$, which are the parameters of the model structure 1, by means of the following numerical expressions 17-22 which are the predetermined conversion expressions.

$$K_2 = \frac{K_{P_2}}{K_{P_1}K_{P_4} - K_{P_2}K_{P_3}} \quad \text{Numerical Expression 17}$$

$$K_3 = \frac{K_{P_3}}{K_{P_1}K_{P_4} - K_{P_2}K_{P_3}} \quad \text{Numerical Expression 18}$$

$$K_1 = \frac{K_{P_1}K_{P_4} - K_{P_2}K_{P_3}}{K_{P_4} - K_{P_2}} \quad \text{Numerical Expression 19}$$

$$K_4 = \frac{K_{P_1}K_{P_4} - K_{P_2}K_{P_3}}{K_{P_1} - K_{P_3}} \quad \text{Numerical Expression 20}$$

-continued $$T_1 = \frac{K_{P_4}}{K_{P_4} - K_{P_2}} b_{P_{41}} \quad \text{Numerical Expression 21}$$

$$T_4 = \frac{K_{P_1}}{K_{P_1} - K_{P_3}} b_{P_{11}} \quad \text{Numerical Expression 22}$$

Thus, the steady gains $K_1$-$K_4$ and the time constants $T_1$ and $T_4$, which are the parameters of the transfer functions $A_{11}$, $A_{12}$, $A_{21}$ and $A_{22}$ of the model structure 1, are decided.

Therefore, in the present preferred embodiment, the parameters $K_{p1}$-$K_{p41}$, $b_{p11}$ and $b_{p41}$ of the black box model that is the model of the controlled object 30 shown in FIG. 20 are calculated through the system identification in a manner similar to the conventional technology. Further, these parameters $K_{p1}$-$K_{p4}$, $b_{p11}$ and $b_{p41}$ are used so that the steady gains $K_1$-$K_4$ and the time constants $T_1$ and $T_4$, which are the parameters of the model structure 1, are decided in accordance with the predetermined conversion expressions 17-22. Among these parameters, the steady gains $K_2$ and $K_3$, which are the parameters of the feedback elements 50 and 51 are used so that the steady gains $K_2$ and $K_3$, which are the parameters of the transfer functions $A'_{12}$ and $A'_{21}$ of the compensating elements 50' and 51' in the non-interference unit 8, are automatically set. Herewith, the non-interference control is performed.

Next, described is a process of deriving the numerical expressions 17-22 which are the predetermined conversion expressions.

Figure 3:
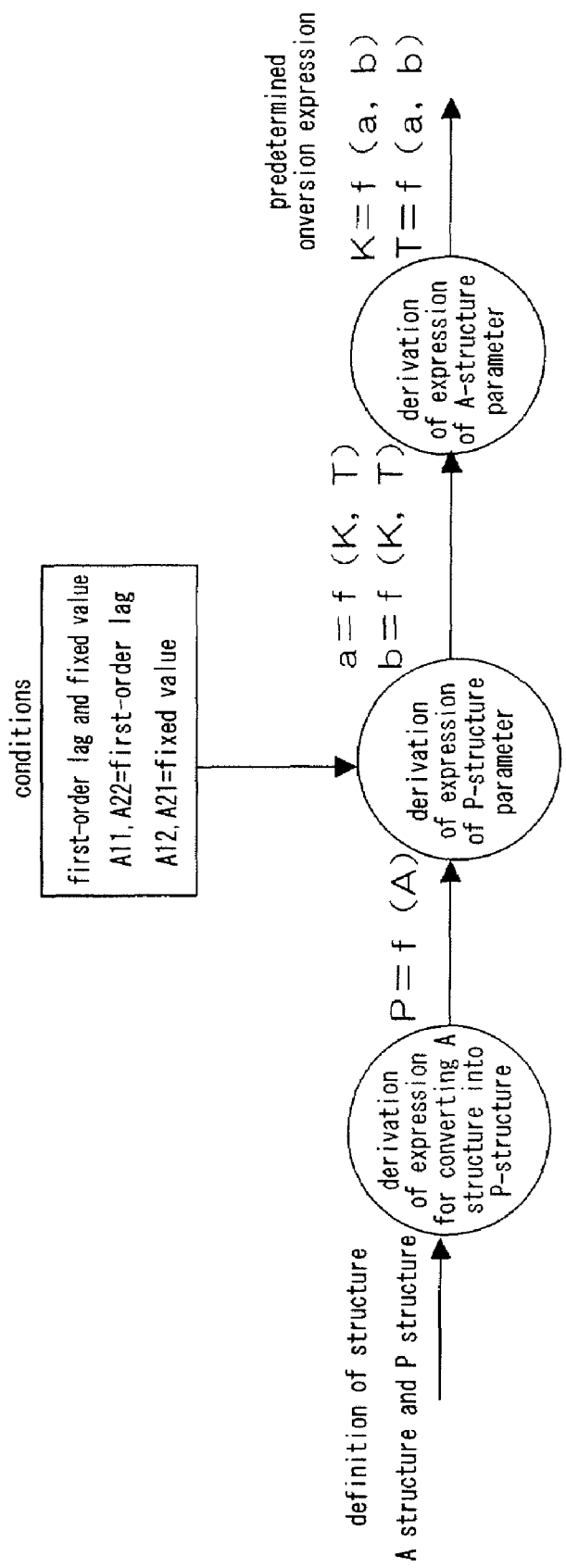
FIG. 3 is a drawing describing a deriving process of predetermined conversion expressions.

FIG. 3 is a drawing describing the deriving process. In FIG. 3, the model structure is shown as "A structure", and the black box model shown in FIG. 20 is shown as "P structure".

First, a relational expression $P=f(A)$ of the transfer functions ($P_{11}$, $P_{12}$, $P_{21}$ and $P_{22}$) of the respective elements of the black box model to the transfer functions ($A_{11}$, $A_{12}$, $A_{21}$ and $A_{22}$) of the elements 50-53 of the model structure 1 is derived from the two definitions of the model structure 1 and the black box model.

Next, the conditions of the transfer functions ($A_{11}$, $A_{12}$, $A_{21}$ and $A_{22}$) of the respective elements of the model structure, which are the conditions that the transfer functions $A_{11}$ and $A_{22}$ are set as first-order lag system and the transfer functions $A_{12}$ and $A_{21}$ are set as fixed values according to the present preferred embodiment, are assigned to the relational expression $P=f(A)$ so that relational expressions $a=f(K,T)$ and $b=f(K,T)$ of the parameters (a, b) of each element of the black box model to the parameters (K, T) of each element of the model structure 1 are derived.

Finally, the relationship of the parameters (K, T) in the respective elements 50-53 of the model structure 1 to the parameters (a, b) in the respective elements of the black box model is calculated so that the relationship between the input and the output is reversed. Then, the predetermined conversion expressions of the aforementioned numerical expressions 17-22, which are $K=f(a,b)$ and $T=(a,b)$, are derived.

Hereinafter, the deriving process is described in more detail.

First, relational expressions of the inputs $u_1$ and $u_2$ and the outputs $y_1$ and $y_2$ of the black box model shown in FIG. 20 are as follows.

$$y_1 = P_{11}u_1 + P_{12}u_2$$

$$y_2 = P_{21}u_1 + P_{22}u_2$$

Meanwhile, relational expressions of the inputs $u_1$ and $u_2$ and the outputs $y_1$ and $y_2$ of the model structure 1 shown in FIG. 20 are as follows.

The input-output relational expressions of the model structure 1 can be derived as follows.

$$y_1 = A_{11}\{(u_1 - A_{12}(y_1 - y_2)\} \quad (1)$$

$$y_2 = A_{22}\{(u_2 + A_{21}(y_1 - y_2)\} \quad (2)$$

Therefore, from the expression (1), $$u_1 - A_{12}(y_1 - y_2) = y_1/A_{11}$$

$$y_1 - y_2 = \{u_1 - (y_1/A_{11})\}/A_{12}$$

$$y_2 = y_1 - \{u_1 - (y_1/A_{11})\}/A_{12}$$

$$= y_1 - (u_1/A_{12}) + y_1/(A_{11}A_{12})$$

$$= [1 + \{1/(A_{11}A_{12})\}]y_1 - (u_1/A_{12})$$

assigned to the expression (2), $$[1 + [1/(A_{11}A_{12})]]y_1 - (u_1/A_{12}) = A_{22}[u_2 + A_{21}\{y_1 - y_1 +$$

$$(u_1/A_{12}) -$$

$$(y_1/(A_{11}A_{12}))\}]$$

$$= A_{22}[u_2 + A_{21}\{-(y_1/(A_{11}A_{12})) +$$

$$(u_1/A_{12})\}]$$

$$= -(A_{22}A_{21}y_1/A_{11}A_{12}) +$$

$$(A_{21}A_{22}u_1/A_{12}) + (A_{22}u_2)$$

Therefore, $$\{1 + (1/(A_{11}A_{12})) + (A_{22}A_{21}/A_{11}A_{12})\}y_1 =$$

$$((1/A_{12}) + (A_{21}A_{22}/A_{12}))u_1 + A_{22}u_2$$

the both sides are multiplied by $(A_{11}A_{12})$.

$$(A_{11}A_{12}+1+A_{22}A_{21})y_1 = (A_{11}+A_{11}A_{21}A_{22})u_1 + A_{11}A_{21}A_{22}u_2$$

$$(1+A_{11}A_{12}+A_{21}A_{22})y_1 = A_{11}(1+A_{21}A_{22})u_1 + A_{11}A_{21}A_{22}u_2$$

Therefore, the following relational expression of the above-mentioned $y_1$ can be derived.

$$y_1 = \{A_{11}(1 + A_{21}A_{22})/(1 + A_{11}A_{12} + A_{21}A_{22})\}u_1 +$$

$$\{(A_{11}A_{12}A_{22})/(1 + A_{11}A_{12} + A_{21}A_{22})\}u_2$$

Through performing similar calculation with regard to $y_2$, a relational expression of the above-mentioned $y_2$ can also be derived.

Through comparing the relevant parameters based on the input-output relational expression of the model structure 1

$$y_1 = \{A_{11}(1 + A_{21}A_{22})/(1 + A_{11}A_{12} + A_{21}A_{22})\}u_1 +$$

$$\{(A_{11}A_{12}A_{22})/(1 + A_{11}A_{12} + A_{21}A_{22})\}u_2$$

$$y_2 = \{(A_{11}A_{21}A_{22})/(1 + A_{11}A_{12} + A_{21}A_{22})\}u_1 +$$

$$\{A_{22}(1 + A_{11}A_{12})/(1 + A_{11}A_{12} + A_{21}A_{22})\}u_2$$

and the input-output relational expression of the black box model thus obtained, the following expressions can be obtained.

$$P_{11}=A_{11}(1+A_{21}A_{22})/(1+A_{11}A_{12}+A_{21}A_{22})$$

$$P_{12}=A_{11}A_{12}A_{22}/(1+A_{11}A_{12}+A_{21}A_{22})$$

$$P_{21}=A_{11}A_{21}A_{22}(1+A_{11}A_{12}+A_{21}A_{22})$$

$$P_{22}=A_{22}(1+A_{11}A_{12})/(1+A_{11}A_{12}+A_{21}A_{22})$$

Next, the following conditions that the transfer functions $A_{11}$ and $A_{22}$ are set as the first-order lag system and the transfer functions $A_{12}$ and $A_{21}$ are set as the fixed values are assigned to these expressions for calculations.

$$A_{11}=K_1/(1+T_1 s)$$

$$A_{12}=K_2$$

$$A_{21}=K_3$$

$$A_{22}=K_4/(1+T_4 s)$$

$$P_{11} = \frac{A_{11}(1+A_{21}A_{22})}{1+A_{11}A_{12}+A_{21}A_{22}} \quad \text{Numerical Expression 23}$$

$$= \frac{\frac{K_1}{1+T_1 s}\left(1+\frac{K_3 K_4}{1+T_4 s}\right)}{1+\frac{K_1 K_2}{1+T_1 s}+\frac{K_3 K_4}{1+T_4 s}}$$

$$= \frac{K_1(1+T_4 s+K_3 K_4)}{(1+T_1 s)(1+T_4 s)+K_1 K_2(1+T_4 s)+K_3 K_4(1+T_1 s)}$$

$$= \frac{K_1+K_1 T_4 s+K_1 K_3 K_4}{1+(T_1+T_4)s+T_1 T_4 s^2+K_1 K_2+K_1 K_2 T_4 s+K_3 K_4+K_3 K_4 T_1 s}$$

$$= \frac{K_1+K_1 K_3 K_4+K_1 T_4 s}{1+K_1 K_2+K_3 K_4+(T_1+T_4+K_1 K_2 T_4+K_3 K_4 T_1)s+T_1 T_4 s^2}$$

$$= \frac{b_{10}+b_{11}s}{a_{10}+a_{11}s+a_{11}s^2}$$

Here, $$b_{10}=K_1+K_1 K_3 K_4$$

$$b_{11}=K_1 T_4$$

$$a_{10}=1+K_1 K_2+K_3 K_4 \quad (3)$$

$$a_{11}=T_1+T_4+K_1 K_2 T_4+K_3 K_4 T_1$$

$$a_{12}=T_1 T_4$$

$$P_{12} = \frac{A_{11}A_{12}A_{22}}{1+A_{11}A_{12}+A_{21}A_{22}} \quad \text{Numerical Expression 24}$$

$$= \frac{\frac{K_1 K_2 K_4}{(1+T_1 s)(1+T_4 s)}}{1+\frac{K_1 K_2}{1+T_1 s}+\frac{K_3 K_4}{1+T_4 s}}$$

$$= \frac{K_1 K_2 K_4}{(1+T_1 s)(1+T_4 s)+K_1 K_2(1+T_4 s)+K_3 K_4(1+T_1 s)}$$

$$= \frac{K_1 K_2 K_4}{1\pm(T_1\pm T_4)s\pm T_1 T_4 s^2\pm K_1 K_2\pm K_1 K_2 T_4 s\pm K_3 K_4\pm K_3 K_4 T_1 s}$$

$$= \frac{K_1 K_2 K_4}{1+K_1 K_2+K_3 K_4+(T_1+T_4+K_1 K_2 T_4+K_3 K_4 T_1)s+T_1 T_4 s^2}$$

$$= \frac{b_{20}}{a_{20}+a_{21}s+a_{22}s^2}$$

Here, $$b_{20}=K_1 K_2 K_4$$

$$a_{20}=1+K_1 K_2+K_3 K_4$$

$$a_{21}=T_1+T_4+K_1 K_2 T_4+K_3 K_4 T_1$$

$$a_{22}=T_1 T_4$$

In a similar manner, $$P_{21}=b_{30}/(a_{30}+a_{31}s+a_{32}s^2)$$

Here, $$b_{30}=K_1 K_3 K_4$$

$$a_{30}=1+K_1 K_2+K_3 K_4$$

$$a_{21}=T_1+T_4+K_1 K_2 T_4+K_3 K_4 T_1$$

$$a_{22}=T_1 T_4$$

In a similar manner, $$P_{22}=b_{40}+b_{41}s/(a_{40}+a_{41}s+a_{42}s^2)$$

Here, $$b_{40}=K_4+K_1 K_2 K_4$$

$$b_{22}=K_4 T_1$$

$$a_{40}=1+K_1 K_2+K_3 K_4$$

$$a_{41}=T_1+T_4+K_1 K_2 K_4+K_3 K_4 T_1$$

$$a_{42}=T_1 T_4$$

Here, the parameters inside the model structure 1 are calculated.

$$K_1=b_{10}-b_{30}(=K_1+K_1 K_3 K_4-K_1 K_3 K_4) \quad (4)$$

$$K_4=b_{40}-b_{20}(=K_4+K_1 K_2 K_4-K_1 K_3 K_4) \quad (5)$$

$$K_2=b_{20}\div K_1\div K_4(=K_1 K_2 K_4\div K_1\div K_4) \quad (6)$$

$$K_3=b_{30}\div K_1\div K_4(=K_1 K_2 K_4\div K_1\div K_4) \quad (7)$$

$$T_4=b_{41}\div K_4(=K_4 T_1\div K_4)$$

$$T_4=b_{11}\div K_1(=K_1 T_1\div K_1)$$

As a result that $K_2$ and $K_3$ are obtained and $A_{12}$ and $A_{21}$ are decided, from these expressions, the transfer functions of the feedback elements 50 and 51 can be set.

However, when the parameters of the black box model are identified, it is not possible to obtain the parameters because $b_{10}$ and $a_{10}$ cannot be calculated separately even though $b_{10}/a_{10}$ can be measured.

Therefore, a method of deciding the parameters inside the model structure from measurable values is examined.

$$P_{11} = (b_{10} + b_{11}s)/(a_{10} + a_{11}s + a_{12}s^2)$$
$$= (b_{10}/a_{10}) \cdot [\{1 + (b_{11}/b_{10})s\}/$$
$$\{1 + (a_{11}/a_{10})s + (a_{12}/a_{10})s^2\}]$$
$$b_{10}/a_{10} = K_{P1}$$

$K_{P1}$ is a value which can be measured as a steady gain. In a similar manner, $$P_{12} = b_{20}/(a_{20} + a_{21}s + a_{22}s^2)$$
$$= (b_{20}/a_{20}) \cdot [1/\{1 + (a_{21}/a_{20})s + (a_{22}/a_{20})s^2\}]$$

Here, there are the following relationships from the foregoing calculation result.

$$a_{10}=a_{20}=a_{30}=a_{40}$$
$$a_{11}=a_{21}=a_{31}=a_{41}$$
$$a_{12}=a_{22}=a_{32}=a_{42}$$

These relational expressions are assigned.

$$= (b_{20}/a_{10}) \cdot [1/\{1 + (a_{11}/a_{10})s + (a_{12}/a_{10})s^2\}]$$
$$b_{20}/a_{10} = K_{P2}$$

In a similar manner, $$P_{21}=b_{30}/(a_{30}+a_{31}s+a_{32}s^2)$$

When modified after the foregoing relational expressions are assigned, $$= (b_{30}/a_{10}) \cdot [1/\{1 + (a_{11}/a_{10})s + (a_{12}/a_{10})s^2\}]$$
$$b_{30}/a_{10} = K_{P3}$$

In a similar manner, $$P_{22}=(b_{40}+b_{41}s)/(a_{40}+a_{41}s+a_{42}s^2)$$

When changed after the foregoing relational expressions are assigned, $$= (b_{40}/a_{10}) \cdot [\{1 + (b_{41}/b_{40})s\}/\{1 + (a_{11}/a_{10})s + (a_{12}/a_{10})s^2\}]$$
$$b_{40}/a_{10} = K_{p4}.$$

$b_{10}$-$b_{40}$ are expressed using easily measurable values=$K_{P1}$-$K_{P4}$.

$$b_{10}=a_{10}K_{P1}$$
$$b_{20}=a_{10}K_{P2}$$
$$b_{30}=a_{10}K_{P3}$$
$$b_{40}=a_{10}K_{P4}$$

These are assigned to the expressions (4)-(7), and finally, the expressions for obtaining $A_{12}$ and $A_{21}$ using the measurable values are shown.

$$K_1 = b_{10} - b_{30}$$
$$= a_{10}K_{P1} - a_{10}K_{P3}$$
$$= a_{10}(K_{P1} - K_{P3})$$

$$K_4 = b_{40} - b_{20}$$
$$= a_{10}K_{P4} - a_{10}K_{P2}$$
$$= a_{10}(K_{P4} - K_{P2})$$

$$K_2 = b_{20} \div (K_1 \cdot K_4)$$
$$= a_{10}K_{P2} \div \{a_{10}(K_{P1} - K_{P3}) \cdot a_{10}(K_{P4} - K_{P2})\}$$
$$= K_{P2}/\{(K_{P1} - K_{P3})(K_{P4} - K_{P2})a_{10}\}$$

$$K_3 = b_{30} \div (K_1 \cdot K_4)$$
$$= a_{10}K_{P3} \div \{a_{10}(K_{P1} - K_{P3}) \cdot a_{10}(K_{P4} - K_{P2})\}$$
$$= K_{P3}/[(K_{P1} - K_{P3})(K_{P4} - K_{P2})a_{10}\}$$

In order to erase $a_{10}$, the values of $K_1$, $K_2$, $K_3$, $K_4$ are assigned to the expression (3) so that the expression of $a_{10}$ is formed.

$$K_1 \cdot K_2 = \{a_{10}(K_{P1} - K_{P3})\} \times \{K_{P2}/[\{(K_{P1} - K_{P3})(K_{P4} - K_{P2})a_{10}\}]$$
$$= K_{P2}/(K_{P4} - K_{P2})$$

$$K_3 \cdot K_4 = [K_{P3}/\{(K_{P1} - K_{P3})(K_{P4} - K_{P2})a_{10}\}] \times a_{10}(K_{P4} - K_{P2})$$
$$= K_{P3}/(K_{P1} - K_{P3})$$

The foregoing expressions are assigned to the expression (3).

$$a_{10} = 1 + K_1K_2 + K_3K_4$$
$$= 1 + \{K_{P2}/(K_{P4} - K_{P2})\} + \{K_{P3}/(K_{P1} - K_{P3})\}$$
$$= [\{(K_{P4} - K_{P2})(K_{P1} - K_{P3}) + K_{P2}(K_{P1} - K_{P3}) +$$
$$K_{P3}(K_{P4} - K_{P2})\}]/[(K_{P4} - K_{P2})(K_{P1} - K_{P3})]$$
$$= (K_{P1}K_{P4} - K_{P2}K_{P3})/(K_{P4} - K_{P2})(K_{P1} - K_{P3})$$

The expression of $a_{10}$ is assigned to the expressions of $K_2$ and $K_3$.

$$K_2 = \{K_{P2}/(K_{P1} - K_{P3})(K_{P4} - K_{P2})\} \cdot$$
$$\{(K_{P4} - K_{P2})(K_{P1} - K_{P3})/(K_{P1}K_{P4} - K_{P2}K_{P3})\}$$
$$= K_{P2}/(K_{P1}K_{P4} - K_{P2}K_{P3})$$

$$K_3 = \{K_{P3}/(K_{P1} - K_{P3})(K_{P4} - K_{P2})\} \cdot$$
$$\{(K_{P4} - K_{P2})(K_{P1} - K_{P3})/(K_{P1}K_{P4} - K_{P2}K_{P3})\}$$
$$= K_{P3}/(K_{P1}K_{P4} - K_{P2}K_{P3})$$

As described above, the numerical expressions 17 and 18, which are the predetermined conversion expressions, can be derived.

Through obtaining also with respect to $K_1$, $K_4$ and $T_1$, $T_4$ in a similar manner, the numerical expressions 19-22, which are the predetermined conversion expressions, can be derived.

In the non-interference control consisting of the constitution as shown in FIG. 1, only the steady gains $K_2$ and $K_3$, which are the parameters of the transfer functions $A'_{12}$ and $A'_{21}$ of the compensating elements 50' and 51' shown in FIG. 2, may be decided. These steady gains $K_2$ and $K_3$ can be calculated from the steady gains $K_{P1}$-$K_{P4}$, which are the parameters of the black box model as shown in the numerical expressions 17 and 18 as the predetermined conversion expressions.

These steady gains $K_{P1}$-$K_{P4}$ can be relatively easily obtained using, for example, the following step response.

More specifically, in the conventional black box model shown in FIG. 20, the input $u_1$ of one of the channels is changed stepwise by $\Delta u_1$ so that change amounts $\Delta y_1$ and $\Delta y_2$ of the outputs $y_1$ and $y_2$ of the respective channels are measured.

Herewith, the steady gains $K_{P1}$ and $K_{P3}$ of the transfer functions $P_{11}$ and $P_{21}$ of the black box model can be calculated in the following expressions.

$$K_{P1} = \Delta y_1 / \Delta u_1$$

$$K_{P3} = \Delta y_2 / \Delta u_1$$

In a similar manner, the input $u_2$ of the other channel is changed stepwise by $\Delta u_2$ so that the change amounts $\Delta y_1$ and $\Delta y_2$ of the outputs $y_1$ and $y_2$ of the respective channels are measured.

As a result, the steady gains $K_{P2}$ and $K_{P4}$ of the transfer functions $P_{12}$ and $P_{22}$ of the black box model shown in FIG. 20 can be calculated in the following expressions.

$$K_{P2} = \Delta y_1 / \Delta u_2$$

$$K_{P3} = \Delta y_2 / \Delta u_2$$

Thus, the steady gains $K_{P1}$-$K_{P4}$, which are the parameters of the black box model, can be obtained based on the output change to the stepwise input. The steady gains $K_2$ and $K_3$, which are the parameters of the transfer functions $A'_{12}$ and $A'_{21}$ of the compensating elements 50' and 51' in the model structure 1 shown in FIG. 2, are calculated from these steady gains $K_{P1}$-$K_{P4}$ based on the numerical expressions 17 and 18 as the predetermined conversion expressions. As a result, the non-interference control can be performed.

According to the present preferred embodiment, therefore, in the parameter deciding unit 70 shown in FIG. 1, the targeted values SP 1 and $SP_2$ are changed so that the operation amounts $u_1$ and $u_2$ to the controlled object 6 are changed stepwise before the non-interference by the non-interference unit 8 starts, and thereby, the changes of the outputs $y_1$ and $y_2$ of the controlled object 6 are respectively measured. Then, the steady gains $K_{P1}$-$K_{P4}$, which are the parameters of the black box model, are obtained from the relevant step response as described. Further, the steady gains $K_2$ and $K_3$, which are the parameters of the transfer functions $A_{12}$ and $A_{21}$ of the feedback elements 50 and 51 in the model structure, are calculated from the steady gains $K_{P1}$-$K_{P4}$ in accordance with the conversion expressions.

The calculated steady gains $K_2$ and $K_3$ are set as the parameters of the transfer functions $A'_{12}$ and $A'_{21}$ of the compensating elements 50' and 51' of the non-interference unit 8, and hereinafter the non-interference control by the non-interference unit 8 is performed.

Therefore, according to the present preferred embodiment, the parameters of the black box model are obtained from the step response in a manner similar to the conventional automatic tuning for deciding the PID constants, and further, the parameters of the model structure 1 are decided. Thereby, non-interference control can be automatically performed.

In the case where it is necessary to decide the steady gains $K_1$ and $K_4$ and the time constants $T_1$ and $T_4$, which are all of the parameters of the model structure 1, not as in the non-interference control but, for example, in the model prediction control or the like, the parameters of the black box model are calculated by means of the system identification which is a conventional method as described.

For example, in the black box model shown in FIG. 20, the input $u_1$ of one of the channels is changed stepwise so that the changes of the outputs $y_1$ and $y_2$ of the respective channels are measured. In a similar manner, the input $u_2$ of the other channel is changed stepwise so that the changes of the outputs of $y_1$ and $y_2$ of the respective channels are measured.

Next, the parameters $K_{p1}$ and $b_{p11}$ of the transfer function $P_{11}$ are obtained by means of the least squares method or the like based on the time-series data of the input $u_1$ of one of the channels and the time-series data of the measured output $y_1$, and the parameter $K_{p3}$ of the transfer function $P_{21}$ is obtained by means of the least squares method or the like based on the time-series data of the input $u_1$ of one of the channels and the time-series data of the measured output $y_2$.

In a similar manner, the parameter $K_{p2}$ of the transfer function $P_{12}$ is obtained by means of the least squares method or the like based on the time-series data of the input $u_2$ of the other channel and the time-series data of the measured output $y_1$, and the parameters $K_{p4}$ and $b_{p41}$ of the transfer function $P_{22}$ are obtained by means of the least squares method or the like based on the time-series data of the input $u_2$ of the other channel and the time-series data of the measured output $y_2$.

Further, using the parameters $K_{p1}$-$K_{p4}$, $b_{p11}$, $b_{p41}$, the steady gains $K_1$-$K_4$ and the time constants $T_1$ and $T_4$, which are the parameters of the model structure 1, are decided in accordance with the predetermined conversion expressions shown in the numerical expressions 17-22.

In the system identification, the present invention is not limited to the step response waveform in which the input is changed stepwise, and the limit cycle waveform or the random waveform of the M series may be applied.

Preferred Embodiment 2

The foregoing preferred embodiment was applied to the model structure having the two inputs and the two outputs. Below described is a preferred embodiment 2 of the present invention that is applied to a model structure having N inputs and N outputs (N is a natural number of at least two).

In the present preferred embodiment, the model structure shown in FIG. 21 is applied to a plurality of channels. As shown in FIG. 4, a plurality (n) of model elements $60_1$-$60_n$ are set as the first-order lag system in which steady gains $K_i$-$K_n$ and time constants $T_1$-$T_n$ are used, and a plurality (n–1) of feedback elements $61_{12}$-$61_{(n-1)n}$ are set as the fixed values in which resistances $\theta_{12}$-$\theta_{(n-1)n}$ are used. In FIG. 4, $P_1$-$P_n$ denote inputs, and $T_1$-$T_n$ denote outputs.

Here, first, the parameters are obtained in the steady state in view of the steady-state properties.

Provided that a transfer functions G(s) of the controlled object of the thermal system is the first-order lag system, it becomes $$G(s) = K/(1+Ts)$$

Here, K is the steady gain, T is the time constant, and s is the operator of the Laplace conversion.

In the steady state, s=0, therefore, G(s)=K.

The steady gain K can be expressed as follows by means of a thermal current (input) P of a fixed value and a steady temperature (output) T, $$K=T/P$$

Meanwhile, a thermal resistance θ can be expressed as follows with the thermal current P and the temperature T through simulating the Ohm's law, $$\theta=T/P$$

Therefore, the steady gain can be expressed as K=θ in the steady state.

Figure 5:
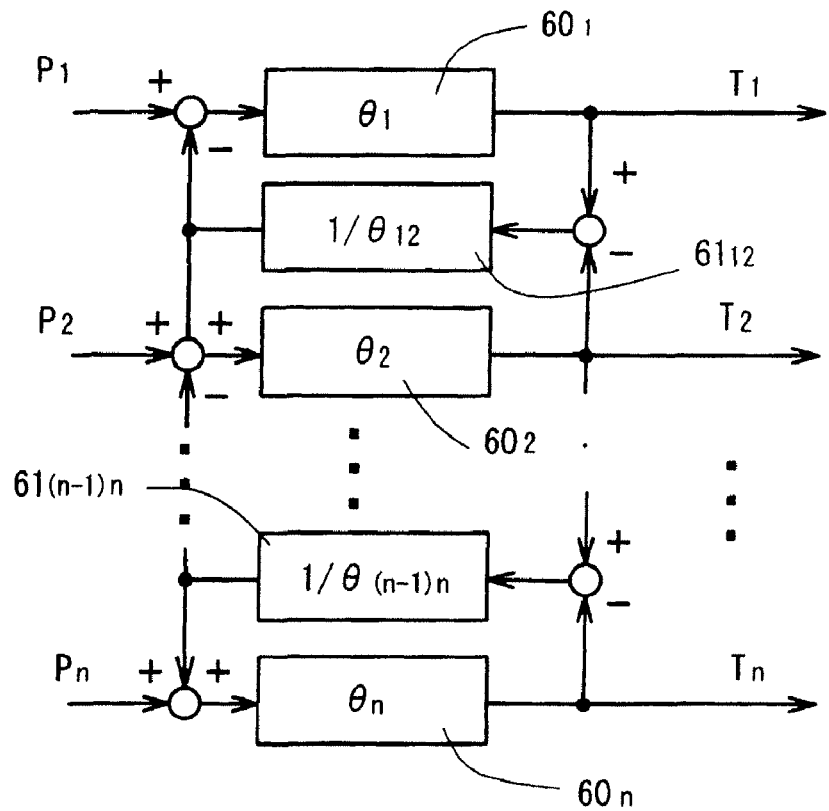
FIG. 5 is a block diagram of FIG. 4 corresponding to a steady state.

Therefore, focusing on only the steady-state characteristics (s=0) in the model structure shown in FIG. 4, the model elements $60_1$-$60_n$ can be replace the steady gains $K_1$-$K_n$ with the thermal resistances $\theta_1$-$\theta_n$ at the same time when the time constants $T_1$-$T_n$ disappear. As shown in FIG. 5, it becomes the model structure comprising the plurality (n) of model elements $60_1$-$60_n$ respectively having the thermal resistances $\theta_1$-$\theta_n$ including one input and one output, and the plurality (n−1) of feedback elements $61_{12}$-$61_{(n-1)n}$ respectively having the thermal resistances $\theta_{12}$-$\theta_{(n-1)n}$ which feed back the output differences of the model elements $60_1$-$60_n$ to the input side.

In the present preferred embodiment, first, the thermal resistances $\theta_1$-$\theta_n$ and $\theta_{12}$-$\theta_{(n-1)n}$, which are the parameters of the respective elements of the model structure shown in FIG. 5, are obtained as follows.

More specifically, provided that the changes of the respective outputs $T_1$-$T_n$ measured in the steady state are $T_{11}$-$T_{1n}$ when the step input $P_{11}$ is inputted to the first input $P_1$, the changes of the respective outputs $T_1$-$T_n$ measured in the steady state are $T_{21}$-$T_{2n}$ when the step input $P_{22}$ is inputted to the second input $P_2$, and the changes of the respective outputs $T_1$-$T_n$ measured in the steady state are $T_{1n}$-$T_{nn}$ when the step input $P_{nn}$ is inputted to the nth input $P_n$, the thermal resistances $\theta_1$-$\theta_n$ and $\theta_{12}$-$\theta_{(n-1)n}$ of the respective elements can be calculated in the following numerical expressions 25 and 26.

Thereto, assuming that the controlled object is a heat treatment board, the heater output for heating the heat treatment board, for example, 100 W, can be supposed as the step inputs $P_{11}$-$P_{nn}$, and the temperature change such as the temperature change in comparison to room temperature can be supposed as $T_{11}$-$T_{nn}$ that are the changes of the respective outputs $T_1$-$T_n$ measured in the steady state.

$$\begin{pmatrix} 1/\theta_1 \\ 1/\theta_2 \\ \vdots \\ 1/\theta_n \end{pmatrix} = \begin{pmatrix} T_{11} & T_{12} & \cdots & T_{1n} \\ T_{21} & T_{22} & \cdots & T_{2n} \\ \vdots & \vdots & & \vdots \\ T_{n1} & T_{n2} & \cdots & T_{nn} \end{pmatrix}^{-1} \begin{pmatrix} P_{11} \\ P_{22} \\ \vdots \\ P_{nn} \end{pmatrix} \quad \text{Numerical Expression 25}$$

Numerical Expression 26
$$\theta_{12} = \frac{T_{11}-T_{12}}{P_{11}-T_{11}/\theta_1},$$

$$\theta_{23} = \frac{T_{12}-T_{13}}{P_{11}-T_{11}/\theta_1-T_{12}/\theta_2}, \ldots ,$$

$$\theta_{(n-1)n} = \frac{T_{1(n-1)}-T_{1n}}{P_{11}-T_{11}/\theta_1-T_{12}/\theta_2-\ldots T_{1(n-1)}/\theta_{(n-1)}}$$

Below described is a reason why the thermal resistances of the respective elements can be calculated in the foregoing expressions.

Figure 6:
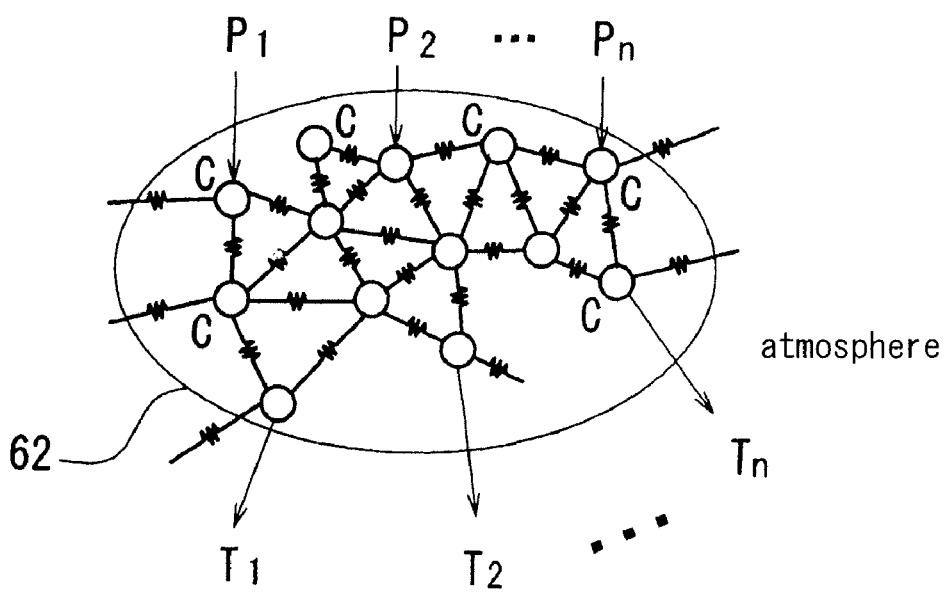
FIG. 6 is a drawing describing a controlled object.

The controlled object is originally the distributed parameter system. For example, assuming that the heat treatment board as the controlled object is temperature-controlled via a plurality of channels, as shown in FIG. 6, the inputs of the heat treatment board as a controlled object 62 are heat quantities $P_1$-$P_n$, of a plurality of heaters which interfere with temperatures $T_1$-$T_n$ of a plurality of sensors via the thermal resistances. C denotes a thermal capacity of each part of the heat treatment board.

Figure 7:
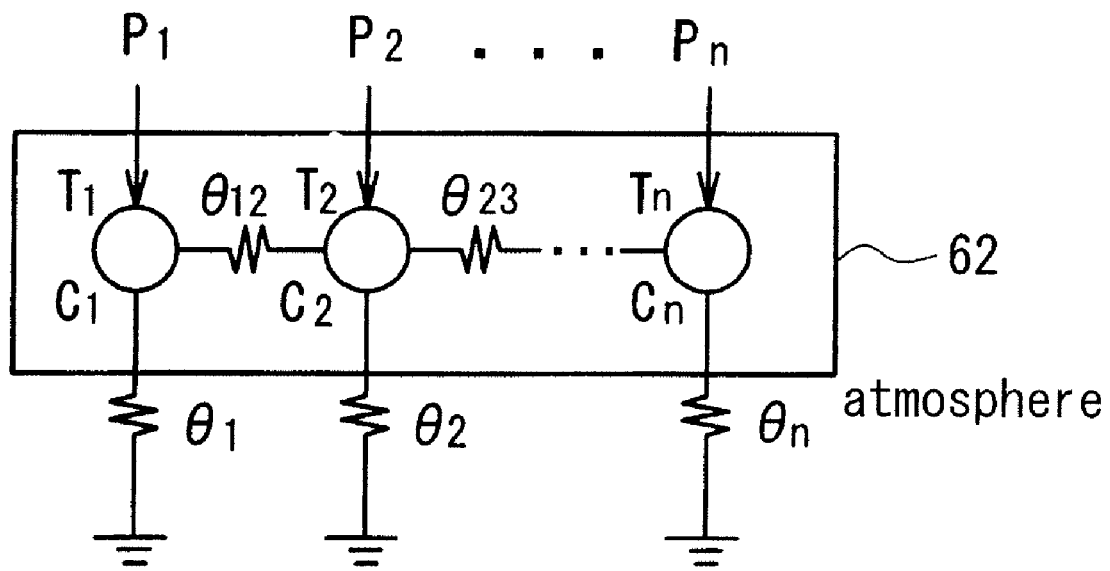
FIG. 7 is an electrical equivalent circuit that approximates FIG. 6.

The distributed parameter system, when approximated to the lumped parameter system, can be shown as an electrical equivalent circuit shown in FIG. 7.

Figure 8:
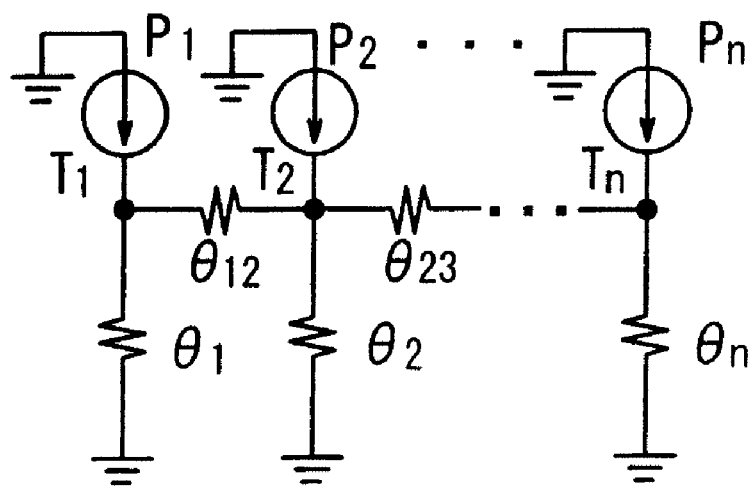
FIG. 8 is an electrical equivalent circuit in the occasion that a thermal capacity in FIG. 7 is C=0.

Since the parameters are obtained in the stead state in the present preferred embodiment, the thermal capacity C can be ignored. As a result, an electrical equivalent circuit shown in FIG. 8 can be obtained, which is equivalent to the model structure shown in FIG. 5.

Assuming the steady state in which only numeral values of the steady gains are handled, any influence from the thermal capacity C included in the time constants can be ignored.

Figure 9:
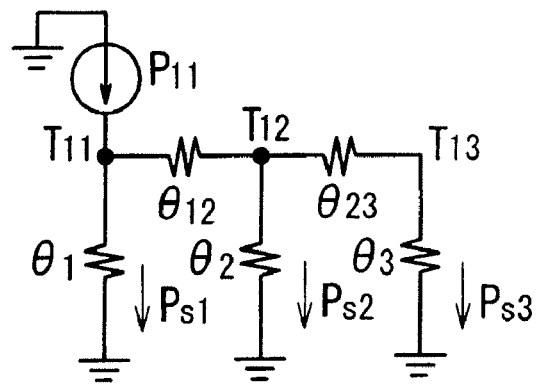
FIG. 9 is an electrical equivalent circuit in the occasion that a step input $P_{11}$ is inputted.

Here, when it is n=3, observing the steady state when the step input of $P_{11}$ is inputted to the first input $P_1$ the following are obtained as shown in FIG. 9, $$Ps_1=T_{11}/\theta_1$$

$$Ps_2=T_{12}/\theta_2$$

$$Ps_3=T_{13}/\theta_3$$

Therefore, $$P_{11}=Ps_1+Ps_2+Ps_3$$

$$P_{11}=T_{11}/\theta_1+T_{12}/\theta_2+T_{13}/\theta_3 \quad (8)$$

Figure 10:
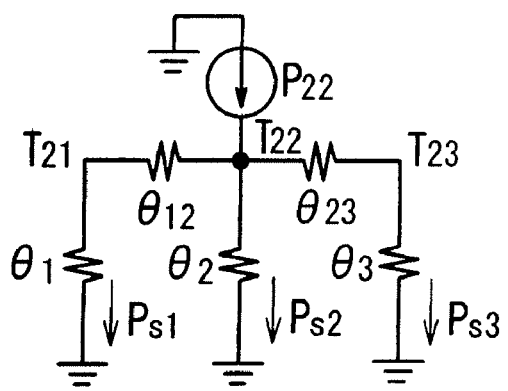
FIG. 10 is an electrical equivalent circuit in the occasion that a step input $P_{22}$ is inputted.

Further, as shown in FIG. 10, when the step input of $P_{22}$ is inputted to the second input $P_2$, similarly the following is obtained, $$P_{22}=T_{21}/\theta_1+T_{22}/\theta_2+T_{23}/\theta_3 \quad (9)$$

Figure 11:
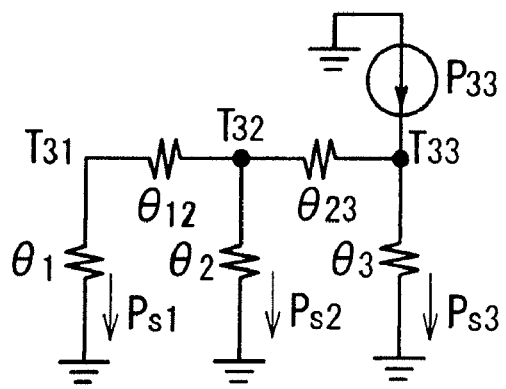
FIG. 11 is an electrical equivalent circuit in the occasion that a step input $P_{33}$ is inputted.

Further, as shown in FIG. 11, when the step input of $P_{33}$ is inputted to the third input $P_3$, similarly the following is obtained, $$P_{33}=T_{31}/\theta_1+T_{32}/\theta_2+T_{33}/\theta_3 \quad (10)$$

From the expressions (8), (9) and (10), $$\begin{pmatrix} P_{11} \\ P_{22} \\ P_{33} \end{pmatrix} = \begin{pmatrix} T_{11} & T_{12} & T_{13} \\ T_{21} & T_{22} & T_{23} \\ T_{31} & T_{32} & T_{33} \end{pmatrix} \begin{pmatrix} 1/\theta_1 \\ 1/\theta_2 \\ 1/\theta_3 \end{pmatrix} \quad \text{Numerical Expression 27}$$

Therefore,

Numerical Expression 28

$$\begin{pmatrix} 1/\theta_1 \\ 1/\theta_2 \\ 1/\theta_3 \end{pmatrix} = \begin{pmatrix} T_{11} & T_{12} & T_{13} \\ T_{21} & T_{22} & T_{23} \\ T_{31} & T_{32} & T_{33} \end{pmatrix}^{-1} \begin{pmatrix} P_{11} \\ P_{22} \\ P_{33} \end{pmatrix} \quad (11)$$

The thermal resistances $\theta_1$-$\theta_3$ are derived from the foregoing expressions.

Additionally, the following expression is established from the data at the time when the step input of P11 is inputted to the first input P1.

$$T_{11}-T_{12}=\theta_{12}(P_{11}-Ps_1)$$

$$T_{12}-T_{13}=\theta_{23}(P_1-Ps_1-Ps_2)$$

Therefore, $$\theta_{12}=(T_{11}-T_{12})/(P_{11}-Ps_1)$$

$$\theta_{23}=(T_{12}-T_{13})/(P_{11}-Ps_1-Ps_2)$$

When $Ps_1=T_{11}/\theta_1$, $Ps_2=T_{12}/\theta_2$, $Ps_3=T_{13}/\theta_3$ are assigned thereto, $$\theta_{12}=(T_{11}-T_{12})/(P_{11}-T_{11}/\theta_1) \quad (12)$$

$$\theta_{23}=(T_{12}-T_{13})/(P_{11}-T_{11}/\theta_1-T_{12}/\theta_2) \quad (13)$$

When the expressions (11), (12) and (13) are extended to Point n, the conclusive numerical expressions 25 and 26 can be obtained.

As described above, the thermal resistances $\theta_1$-$\theta_n$ and $\theta_{12}$-$\theta_{(n-1)n}$, which are the parameters of the respective elements of the model structure shown in FIG. 5, can be obtained from the steady state.

Next, referring to the model structure shown in FIG. 4, the time constant T is expressed with the product $C \cdot \theta$ of the thermal capacity C and the thermal resistance $\theta$. Therefore, the time constants $T_1$-$T_n$ of the model elements $60_1$-$60_n$ shown in FIG. 4 can be expressed as below with the thermal capacities $C_1$-$C_n$ and the thermal resistances $\theta_1$-$\theta_n$.

$$T_1\text{-}T_n=C_1\cdot\theta_1\text{-}C_n\cdot\theta_n$$

When the heat treatment board is supposed as an example of the controlled object 62, the thermal capacity C can be obtained from materials and dimensions thereof.

Therefore, when the user sets the fixed thermal capacities $C_1$-$C_n$, the parameters of the model elements $60_1$-$60_n$ and the parameters of the feedback elements $61$-$61_{(n-1)n}$ in the model structure shown in FIG. 4 can be decided from the thermal resistances $\theta_1$-$\theta_n$ and $\theta_{12}$-$\theta_{(n-1)n}$ thus obtained and the thermal capacities $C_1$-$C_n$ preliminarily set.

More specifically, the steady gains $K_1$-$K_n$, which are the parameters of the first-order lag system, are decided as the thermal resistances $\theta_1$-$\theta_n$, the time constants $T_1$-$T_n$ are decided as the product $(C_1\cdot\theta_1\text{-}C_n\cdot\theta_n)$ of the thermal resistances $\theta_1$-$\theta_n$ and the thermal capacities $C_1$-$C_n$ set by the user, and the fixed values of the feedback elements $61$-$61_{(n-1)n}$ are decided from the thermal resistances $\theta_{12}$-$\theta_{(n-1)n}$.

Therefore, also in the present preferred embodiment, the model elements $60_1$-$60_n$ are set as the first-order lag system, and the feedback elements $61$-$61_{(n-1)n}$ are set as the fixed values in a manner similar to the foregoing preferred embodiment.

Figure 12:
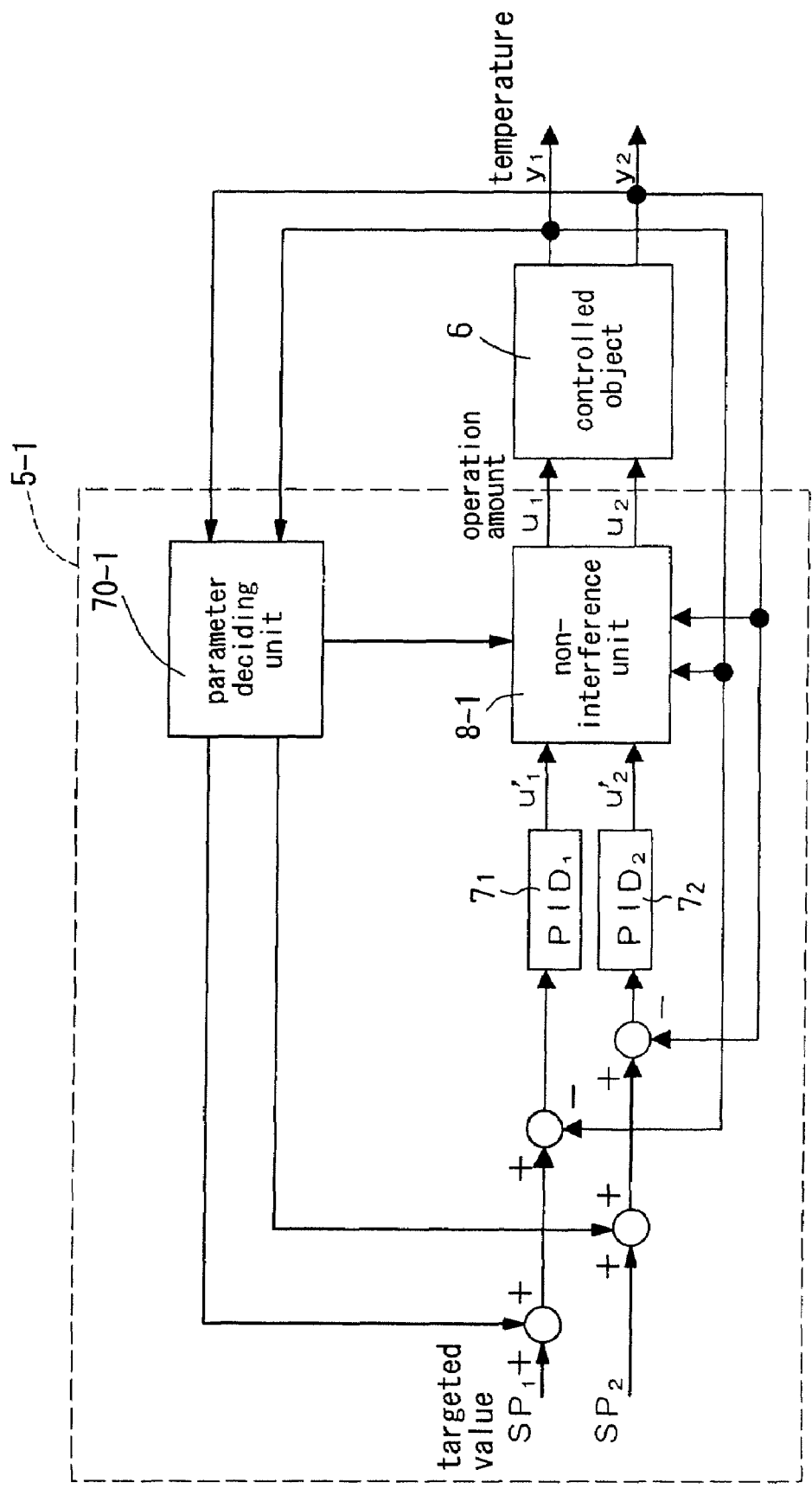
FIG. 12 shows a schematic constitution of a temperature control system according to another preferred embodiment of the present invention.

FIG. 12 is a block diagram illustrating constitution of a temperature control system in which the present preferred embodiment is applied to the non-interference control via two channels, wherein each part shown in the drawing corresponding to that of FIG. 1 is given the same reference symbol.

Figure 13:
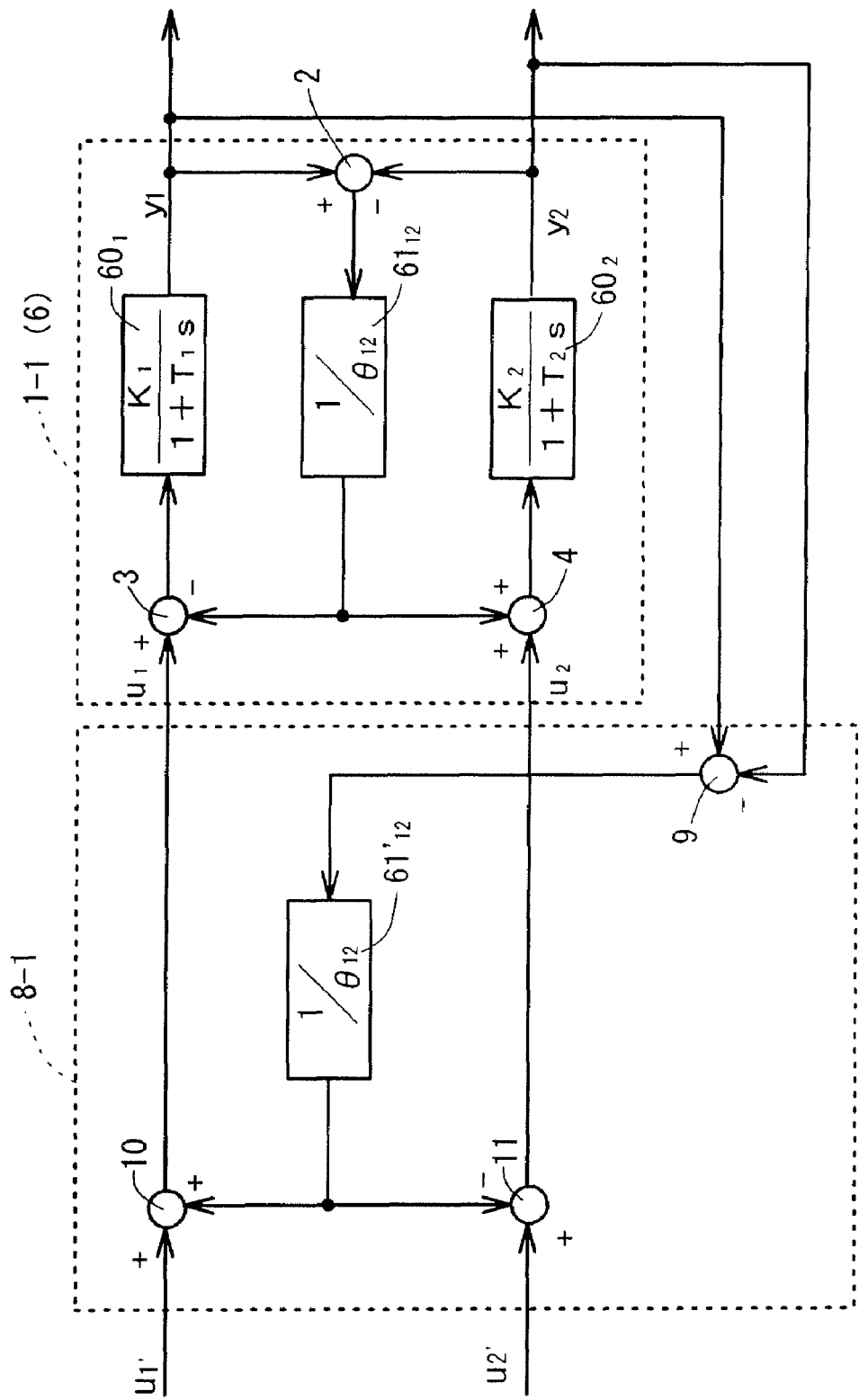
FIG. 13 is a block diagram of a non-interference unit 8-1 shown in FIG. 12 and a model structure 1-1 which is a model to be controlled.

FIG. 13 is a block diagram of a non-interference unit 8-1 and a model structure 1-1 of the controlled object 6 shown in FIG. 12, wherein each part shown in the drawing corresponding to that of FIG. 2 is given the same reference symbol.

In the model structure 1-1, the model structure comprising the plurality of channels shown in FIG. 4 is applied to the two channels. The non-interference unit 8-1 comprises a subtracter 9 for calculating a difference between the two outputs $y_1$ and $y_2$ of the model structure of the controlled object 6, a compensating element $61_{12'}$ to which the output of the subtracter 9 is fed, and an adder 10 and a subtracter 11 for adding or subtracting the output of the compensating element $61_{12'}$ to the inputted operation amounts $u_1'$ and $u_2'$.

The compensating element $61_{12'}$ correspond to the feedback element $61_{12}$ of the model structure 1-1.

The transfer function of the compensating element $61_{12'}$ is equal to the transfer function of the feedback element $61_{12}$. The output of the compensating element $61_{12'}$ is fed back to the inputted operation amounts $u_1'$ and $u_2'$ after reversing positive or negative polarity to the outputs of the feedback element $61_{12}$ of the model structure 1-1.

A parameter deciding unit 70-1 calculates the thermal resistances $\theta_1$, $\theta_2$ and $\theta_{12}$ as below before the non-interference by the non-interference unit 8-1 starts.

More specifically, the targeted value $SP_1$ is changed so that the operation amount of one of the channels to the controlled object 6 is changed up to 100% stepwise, and then, the output change of the controlled object 6 is measured. The targeted value $SP_2$ is changed so that the operation amount of the other channel to the controlled object 6 is changed up to 100% stepwise, and then, the output change of the controlled object 6 is measured.

The thermal resistances $\theta_1$, $\theta_2$ and $\theta_{12}$ are calculated from the relevant measurement result in accordance with the numerical expressions 25 and 26, and the thermal resistance $1/\theta_{12}$, that is the parameter of the compensating element $61_{12'}$ of the non-interference unit 8-1 is set. Thereafter, the non-interference control by the non-interference unit 8-1 is performed.

Furthermore, in the case where it is necessary to decide all of the parameters $K_1$ $(=\theta_1)$, $K_2(=\theta_2)$, $T_1$ $(=C_1\cdot\theta_1)$ and $T_2$ $(=C_2\cdot\theta_2)$ of the model structure 1-1 as in, for example, the model prediction control in place of the non-interference control, the user sets the fixed thermal capacities $C_1$ and $C_2$ in the parameter setting unit 70-1 from a setting unit not shown. Then, those parameters can be decided based on the calculated thermal resistances $\theta_1$ and $\theta_2$.

The present preferred embodiment can be applied to the control using at least three channels.

According to the present preferred embodiment, the thermal resistance is obtained through the step input. As a different embodiment of the present invention, for example, all the other inputs except for only one of the inputs are turned off in the steady state, and the thermal resistance may be obtained based on the relevant input and output.

Figure 14:
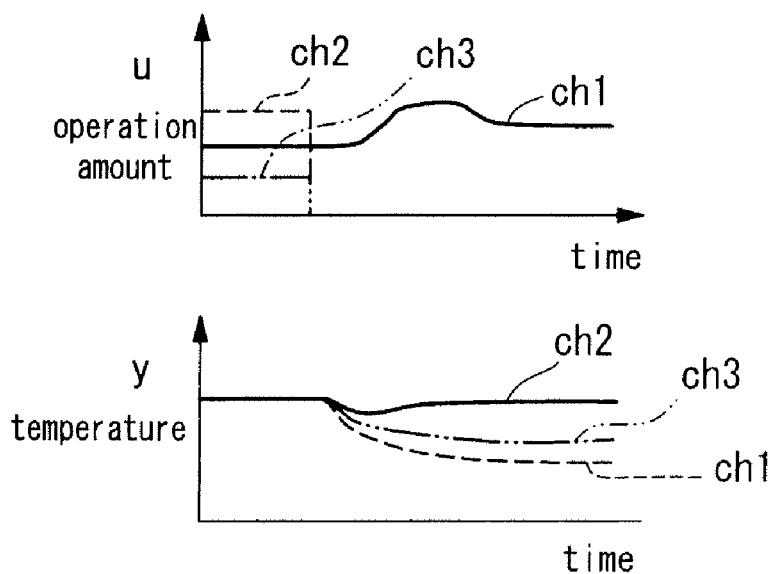
FIG. 14 shows drawings describing another preferred embodiment of measurement of a thermal resistance.

Describing the case of three channels, for example, as shown in FIG. 14, the operations amounts u of the channels ch2 and ch3 other than the first channel ch1 are all turned off, for example, as shown in the drawing (a) in a state where the operation amounts u and the temperatures y of the respective channels ch1-ch3 are stable in the steady state. Then, the state equivalent to that of FIG. 9 is generated, and the operation amount u of the first channel ch1 corresponds to $P_{11}$ shown in FIG. 9, and the temperature changes of the respective channels correspond to $T_{11}$, $T_{12}$, $T_{13}$. Therefore, when the operation amounts of all of the channels except for the relevant channel are turned off and the temperature is measured with respect to each of the channels in the steady state, the thermal resistance can be obtained in a manner similar to the foregoing description. Herewith, the present preferred embodiment can be applied to a system in which it is difficult to use the step input due to a limitation in heat resistance. Though described is the simple example where only one channel is left, the thermal resistance can still be obtained when an equation is solved also in the case where the operation amounts of a plurality of channels are left and the operation amounts of the rest of the channels are turned off.

Preferred Embodiment 3

In the aforementioned preferred embodiment 2, it is necessary for the user to set the thermal capacity C in order to decide all of the parameters in the model structure 1-1 as in the model prediction control, which is troublesome.

So, in this preferred embodiment of the present invention, it is unnecessary for the user to set the thermal capacities $C_1$-$C_n$ which regulate the time constants $T_1$-$T_n$=$C_1 \cdot \theta_1$-$C_n \cdot \theta_n$ of the respective channels in the model structure shown in FIG. 4, the parameters are obtained from a maximum tilt R in the step response waveform of the controlled object 6.

Figure 15:
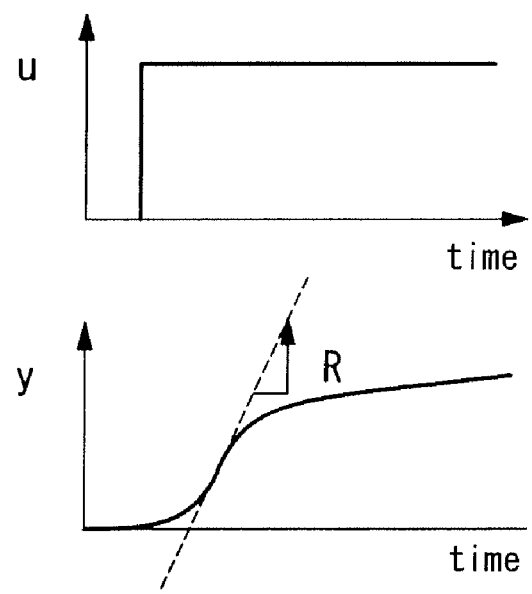
FIG. 15 shows drawings showing a maximum tilt of a step response waveform.

In the response waveform of the output y of the controlled object shown in FIG. 15(b) to the stepwise input u shown in FIG. 15(a), the maximum tilt R is expressed with the steady gain K and the time constant T in the following expression.

$$R=K/T$$

Here, because the steady gain K can be expressed with the thermal resistance $\theta$ as described above, and the time constant T can be expressed with the product of the thermal capacity C and the thermal resistance $\theta$, it becomes $$R=K/T=\theta/C \cdot \theta=1/C$$

Accordingly, the thermal capacity C is C=1/R.

Therefore, through measuring the maximum tilt R of the step response waveform of the controlled object, the thermal capacity C can be obtained.

More specifically, 100% of the stepwise operation amount is inputted with respect to each of the channels, and the maximum tilt R is measured from the response waveform in order to calculate the thermal capacity C.

Figure 16:
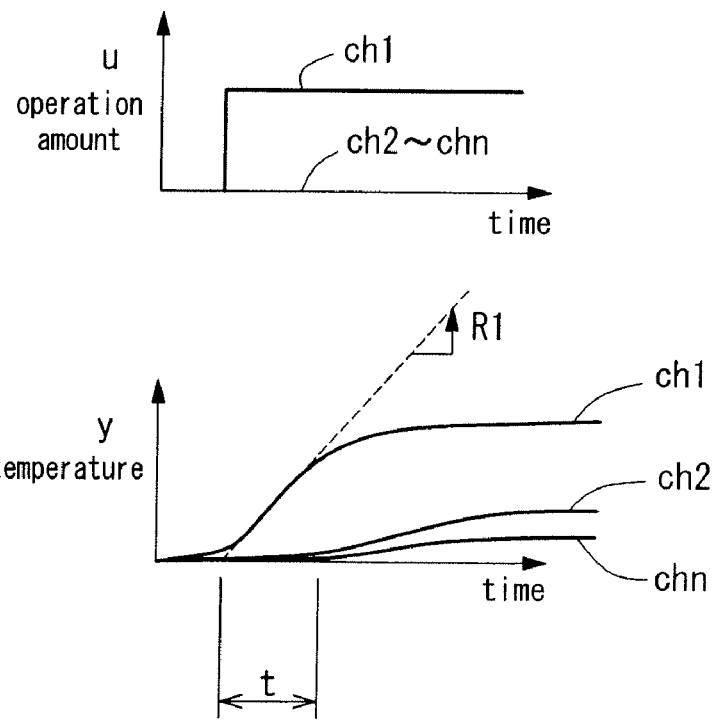
FIG. 16 shows drawings for describing measurement of maximum tilts of respective channels.

As shown in FIG. 16(a), for example, 100% of the operation amount is inputted stepwise to the first channel ch1. Then, a maximum tilt $R_1$ of the first channel is measured from the response waveform of the first channel ch1 as shown in FIG. 16(b).

As receiving no influence from the other channels ch2-chn at the time, namely, taking up a time period t when the temperatures of the other channels are not changed, the maximum tilt $R_1$ is measured.

Hereinafter, in a similar manner, 100% of the stepwise operation amounts are sequentially inputted to the rest of the channels ch2-chn, and maximum tilts $R_2$-$R_n$ are measured from the relevant response waveforms.

Through measuring the maximum tilts $R_2$-$R_n$ of the respective channels ch1-chn as described above, the thermal capacities $C_1$-$Cc_n$ of the respective channels ch1-chn can be calculated in accordance with the following expression.

$$C_1\text{-}C_n=1_n/R_1\text{-}1/R_n$$

Therefore, in the present preferred embodiment, the thermal resistances $\theta_1$-$\theta_n$ and $\theta_{12}$-$\theta_{(n-1)n}$ of the model structure shown in FIG. 4 are obtained in a manner similar to the preferred embodiment 2, while the parameters of the respective elements can be obtained from the thermal capacities $C_1$-$C_n$ obtained from the maximum tilts $R_1$-$R_n$ of the step response waveforms. As a result, without necessity for setting the thermal capacities $C_1$-$C_n$ by the user as in the preferred embodiment 2, the parameters of the respective elements can be calculated.

Additionally, the stepwise input is fed, and the relevant response waveform is measured, in other words, the change of the output to the change of the input is measured. Therefore, the measurement result may be utilized so that the thermal resistances $\theta_1$-$\theta_n$ and $\theta_{12}$-$\theta_{(n-1)n}$ may be obtained together in a manner similar to the preferred embodiment 2.

Namely, the measurement for obtaining the thermal capacity and the measurement for obtaining the thermal resistance may be separately performed or simultaneously performed.

Figure 17:
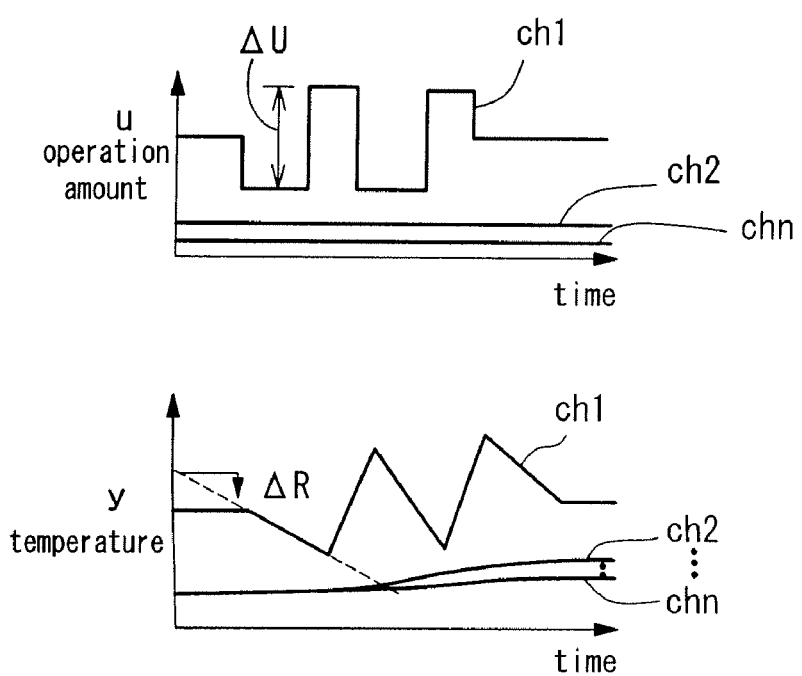
FIG. 17 shows drawings for describing measurement of maximum tilts based on a limit cycle.

Furthermore, in the present preferred embodiment, the maximum tilt R is obtained from the step response waveform. As the other embodiment, the maximum tilt R may be obtained from the limit cycle waveform as shown in FIG. 17.

As shown in FIG. 17(a), for example, only the operation amount u of the first channel ch1 is turned on/off so as to be changed by $\Delta u$, and the maximum tilt R is calculated from a change $\Delta R$ of the tilt of the response waveform in the following expression.

$$R=\Delta R/\Delta u$$

Figure 18:
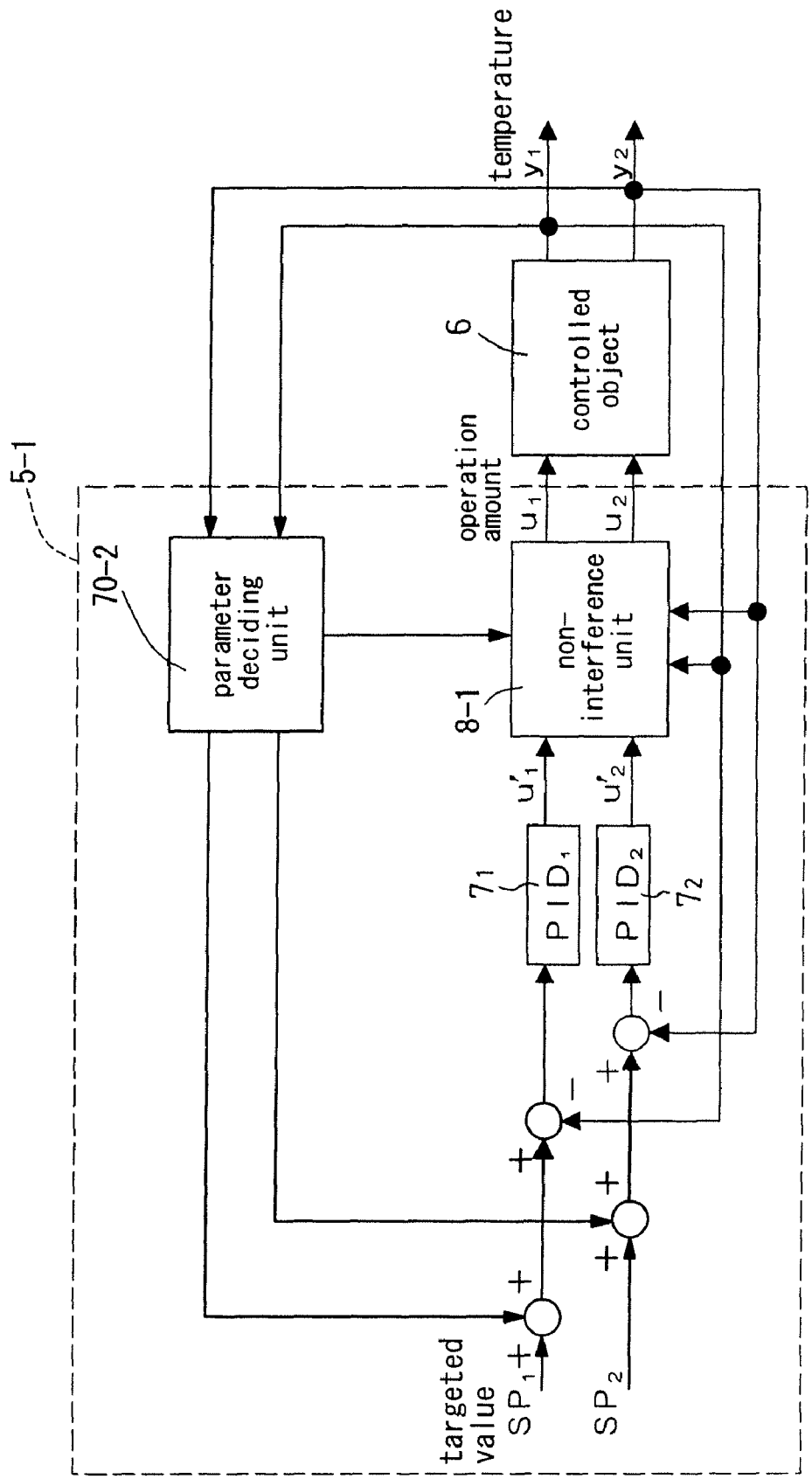
FIG. 18 shows a schematic constitution of a temperature control system according to yet another preferred embodiment of the present invention.

FIG. 18 is a block diagram illustrating a constitution of a temperature control system where the present preferred embodiment is applied to the non-interference control of two channels, wherein each part corresponds to that of FIG. 12 is given the same reference symbol.

A parameter deciding unit 70-2 according to the present preferred embodiment measures the output change of the controlled object 6 by sequentially changing the targeted values $SP_1$ and $SP_2$ so that the operation amounts to the controlled object 6 are changed stepwise before the non-interference by the non-interference unit 8-1 starts, and calculates the thermal resistances $\theta_1$, $\theta_2$, and $\theta_{12}$ in accordance with the numerical expressions 25 and 26, while measuring the maximum tilts $R_1$ and $R_2$ of the respective channels so as to calculate the thermal capacities $C_1$ and $C_2$ of the respective channels. As a result, all of the parameters $K_1$ (=$\theta_1$), $K_2$ (=$\theta_2$), $T_1$(=$C_1 \cdot \theta_1$), and $T_2$(=$C_2 \cdot \theta_2$) of the model structure 1-1 can be decided.

In the present preferred embodiment, the parameter deciding unit 70-2 sets the thermal resistance $1/\theta_{12}$, that is the parameter of the compensating element $61_{12}'$ of the non-interference unit 8-1, among all of the parameters, and thereafter the non-interference control by the non-interference unit 8-1 is performed.

As just described, by changing the operation amount to the controlled object 6 so that the response waveform is measured, all of the parameters of the model structure 1-1 can be decided through the measurements of the thermal resistances $\theta_1$, $\theta_2$, $\theta_{12}$ and the maximum tilts $R_1$ and $R_2$. As a result, it becomes unnecessary for the user to set the thermal resistance, which enables all of the parameters to be automatically decided.

Another Preferred Embodiment

As a model structure according to another preferred embodiment, it may be constituted so as to include the corrected values $H_1$-$H_{n-1}$ for correcting variation in heater capacities between the respective channels when there is variation between them, for example, as shown in FIG. 19.

In the preferred embodiments described above, the parameter deciding unit is incorporated in the device. However, the parameter deciding unit may be independently provided.

INDUSTRIAL APPLICABILITY

The present invention is useful for performing various measurements and control operations using a model.

What is claimed is:
1. A method of deciding parameters of a model structure of a controlled object using parameters of a black box model of the controlled object, wherein
  the parameters of the model structure are decided based on the parameters of the black box model in accordance with predetermined conversion expressions, the model structure is provided with a plurality of inputs and a plurality of outputs, and comprises a plurality of model elements having one input and one output, each one output corresponding to a physical quantity of its respective model element and each one input corresponding to a parameter to control the respective physical quantity, and at least one feedback element, each at least one feedback element for feeding back a difference between outputs of a respective two model elements of the plurality of model elements to the input side of the respective model elements, transfer functions of the model elements of the model structure are first-order lag system, the predetermined conversion expressions include an expression for calculating steady gains and time constants of the transfer functions of the first-order lag system from the parameters of the black box model; and controlling physical quantities of the controlled object based on the parameters of the model structure.

2. The method of deciding parameters of a model structure as claimed in claim 1, wherein the parameters of the black box model are obtained through system identification.

3. The method of deciding parameters of a model structure as claimed in claim 1, wherein the model elements and the feedback element comprise resistance components, and parameters of the black box model are decided based on changes of the plurality of outputs generated when respective inputs of the controlled object that is a target of the model structure are changed.

4. The method of deciding parameters of a model structure as claimed in claim 3, wherein the model elements comprise capacity components in addition to the resistance components.

5. The method of deciding parameters of a model structure as claimed in claim 3, wherein the parameters are decided based on the changes of the respective outputs generated when the respective inputs of the controlled object are changed stepwise.

6. A device for deciding parameters of a model structure of a controlled object using parameters of a black box model of the controlled object, wherein the parameters of the model structure are decided based on the parameters of the black box model in accordance with predetermined conversion expressions, the model structure is provided with a plurality of inputs and a plurality of outputs and comprises a plurality of model elements having one input and one output, each one output corresponding to a physical quantity of its respective model element and each one input corresponding to a parameter to control the respective physical quantity, and at least one feedback element, each at least one feedback element for feeding back an output difference between a respective two model elements of the plurality of model elements to the input side of the model elements, transfer functions of the model elements of the model structure are first-order lag system, the predetermined conversion expressions include an expression for calculating steady gains and time constants of the transfer functions of the first-order lag system from the parameters of the black box model; and a plurality of physical quantity control units for outputting operation amounts to the controlled object based on parameters of the model structure.

7. The device for deciding parameters of a model structure as claimed in claim 6 wherein the parameters of the black box model are obtained through system identification.

8. The device for deciding parameters of a model structure as claimed in claim 6, wherein the model elements and the feedback element comprise resistance components, and parameters of the black box model are decided based on changes of the plurality of outputs generated when respective inputs of the controlled object that is a target of the model structure are changed.

9. The device for deciding parameters of a model structure as claimed in claim 8, wherein the model elements comprise capacity components in addition to the resistance components.

10. The device for deciding parameters of a model structure as claimed in claim 8, wherein the parameters are decided based on the changes of the respective outputs when the respective inputs of the controlled object are changed stepwise.

11. A control device for controlling a model structure provided with a plurality of inputs and a plurality of outputs, wherein an output difference between the plurality of outputs is fed back to the input side, as a model of a controlled object, and the control device comprises the device for deciding the parameters recited in claim 6, and decides the parameters of the model structure using the device for deciding the parameters.

12. A temperature adjustment device for controlling a temperature of a model structure provided with a plurality of inputs and a plurality of outputs, wherein a temperature difference that is a difference between the plurality of outputs is fed back to the input side, as a model of a controlled object, and the temperature adjustment device comprises the device for deciding the parameters recited in claim 6, and decides the parameters of the model structure using the device for deciding the parameters.

13. The temperature adjustment device as claimed in claim 12, comprising:

a plurality of temperature control units for outputting operation amounts to the controlled object based on a plurality of detected temperatures from the controlled object; and a non-interference unit for processing the operation amounts from each of the temperature control units and outputting the processed operation amounts to the controlled object so as to remove or reduce influence of the control through the respective temperature control units to the control by the other temperature control unit, wherein the non-interference unit realizes the non-interference using the model structure, and the model structure feeds back a difference between the detected temperatures to an operation-amount side of the temperature adjustment device.

* * * * *